US007689240B2

(12) United States Patent
Anderson

(10) Patent No.: US 7,689,240 B2
(45) Date of Patent: Mar. 30, 2010

(54) TRANSMIT-POWER CONTROL FOR WIRELESS MOBILE SERVICES

(75) Inventor: Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 824 days.

(21) Appl. No.: 11/280,643

(22) Filed: Nov. 16, 2005

(65) Prior Publication Data

US 2007/0111746 A1    May 17, 2007

(51) Int. Cl.
| | |
|---|---|
| H04B 7/00 | (2006.01) |
| H04B 1/00 | (2006.01) |
| H04B 1/56 | (2006.01) |
| H04W 24/00 | (2009.01) |
| G08B 1/08 | (2006.01) |
| G08B 21/00 | (2006.01) |
| G08B 13/00 | (2006.01) |
| G01S 1/00 | (2006.01) |
| G01S 1/24 | (2006.01) |
| G01S 3/02 | (2006.01) |
| G01R 31/08 | (2006.01) |
| G06F 11/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/16 | (2006.01) |
| H04L 5/14 | (2006.01) |
| H04Q 11/00 | (2006.01) |

(52) U.S. Cl. .................... 455/522; 455/69; 455/423; 455/456.1; 340/539.11; 340/540; 340/541; 342/357.06; 342/387; 342/457; 370/245; 370/332; 370/338

(58) Field of Classification Search ................ 455/13.4, 455/69, 70, 84, 125, 126, 127.1, 127.2, 134, 455/136, 137, 138, 404.1, 404.2, 405, 418, 455/419, 420, 456.1, 456.2, 515, 522, 12.1, 455/67.1, 423, 433, 435.1, 446, 456.5; 342/174, 342/357.06, 387, 442, 457, 465, 357.02, 342/360, 463, 357.01; 370/336, 254, 245, 370/332, 337, 338; 340/539.11, 539.13, 340/540, 541
See application file for complete search history.

(56) References Cited

U.S. PATENT DOCUMENTS 4,728,959 A    3/1988    Maloney et al. ............. 342/457

(Continued)

FOREIGN PATENT DOCUMENTS

WO    WO 98/48575    10/1998

OTHER PUBLICATIONS

Examination Report dated Sep. 4, 2009, issued in corresponding Australian Application No. 2006315220, 2 pages.

Primary Examiner—Nay A Maung
Assistant Examiner—Paul P Tran
(74) Attorney, Agent, or Firm—Woodcock Washburn LLP

(57) ABSTRACT

A method and system for enhancing the performance of augmented services associated with a wireless communications system through the dynamic exploitation of current measurements and operational configuration parameters to accurately and effectively control the signal power and duration transmitted by the mobile unit of interest.

111 Claims, 3 Drawing Sheets

U.S. PATENT DOCUMENTS

| | | | |
|---|---|---|---|
| 5,327,144 A | 7/1994 | Stilp et al. | 342/387 |
| 5,442,805 A * | 8/1995 | Sagers et al. | 455/456.5 |
| 5,608,410 A | 3/1997 | Stilp et al. | 342/387 |
| 5,959,580 A | 9/1999 | Maloney et al. | 342/457 |
| 6,047,192 A | 4/2000 | Maloney et al. | 455/456.2 |
| 6,091,362 A | 7/2000 | Stilp et al. | 342/465 |
| 6,097,336 A | 8/2000 | Stilp | 342/357.02 |
| 6,101,178 A | 8/2000 | Beal | 370/336 |
| 6,108,555 A | 8/2000 | Maloney et al. | 455/456.2 |
| 6,115,599 A | 9/2000 | Stilp | 455/404.1 |
| 6,119,013 A | 9/2000 | Maloney et al. | 455/456.2 |
| 6,127,975 A | 10/2000 | Maloney | 342/457 |
| 6,172,644 B1 | 1/2001 | Stilp | 342/457 |
| 6,184,829 B1 | 2/2001 | Stilp | 342/387 |
| 6,266,013 B1 | 7/2001 | Stilp et al. | 342/387 |
| 6,281,834 B1 | 8/2001 | Stilp | 342/174 |
| 6,285,321 B1 | 9/2001 | Stilp et al. | 342/465 |
| 6,288,675 B1 | 9/2001 | Maloney | 342/457 |
| 6,288,676 B1 | 9/2001 | Maloney | 342/457 |
| 6,317,081 B1 | 11/2001 | Stilp | 342/387 |
| 6,317,604 B1 | 11/2001 | Kovach, Jr. et al. | 455/456.5 |
| 6,334,059 B1 | 12/2001 | Stilp et al. | 455/404.2 |
| 6,351,235 B1 | 2/2002 | Stilp | 342/357.06 |
| 6,366,241 B2 | 4/2002 | Pack et al. | 342/442 |
| 6,388,618 B1 | 5/2002 | Stilp et al. | 342/457 |
| 6,400,320 B1 | 6/2002 | Stilp et al. | 342/457 |
| 6,463,290 B1 | 10/2002 | Stilp et al. | 455/456.1 |
| 6,519,465 B2 | 2/2003 | Stilp et al. | 455/456.1 |
| 6,560,462 B1 * | 5/2003 | Ravi et al. | 455/456.1 |
| 6,661,379 B2 | 12/2003 | Stilp | 342/457 |
| 6,748,233 B1 | 6/2004 | Arnold et al. | |
| 6,845,246 B1 * | 1/2005 | Steer | 455/522 |
| 7,024,163 B1 * | 4/2006 | Barratt et al. | 455/69 |
| 7,091,902 B2 * | 8/2006 | Liu et al. | 342/174 |
| 7,123,600 B2 | 10/2006 | Ozluturk et al. | 370/335 |
| 7,440,762 B2 * | 10/2008 | Maloney et al. | 455/456.1 |
| 2003/0210186 A1 * | 11/2003 | Sollenberger et al. | 342/387 |
| 2004/0239558 A1 * | 12/2004 | Geier et al. | 342/357.06 |

* cited by examiner

TRANSMIT-POWER CONTROL FOR WIRELESS MOBILE SERVICES

TECHNICAL FIELD

The present invention relates generally to facilities to enhance the operation of cellular wireless communications systems, and more particularly to the operation of such systems in manners that facilitate the provision of services that augment the basic communications services of the systems. Specifically, the control or management of the power that is transmitted by the wireless mobile units served by the communications system is itself enhanced to enable or enhance the performance of all services derived from the communications system, especially those that augment the fundamental communications services. Some of the exemplary aspects of the present invention are particularly suited to a wireless location system and related methods and subsystems that provide mobile-station location determination through the exploitation of the normal communications transmissions of standard cellular wireless communications systems. It should be noted, however, that although aspects of the systems and methods described herein relate specifically to operational technologies for the benefit of wireless location systems, the claims at the end of this specification are not to be construed as limited to applications to wireless location systems, except as they may be explicitly so limited.

BACKGROUND

The present invention relates to the provision of services in augmentation of the standard communications service from a cellular wireless communications system. In particular, the mobile units of primary interest are cellular telephones, personal digital assistants, wireless-equipped laptop computers, and other similar devices equipped with wireless transceivers for normal operation under a "cellular" telephone system, such as those implemented in accord with the GSM, UMTS, CDMA, and TDMA standards and specifications.

An objective of the present invention is to provide the technology for enhanced automated control of the power transmitted by the wireless mobile communications units, so that the desired and required services can be effectively and accurately maintained, while also optimally conserving the energy available in the mobile units. In particular, the technology of the present invention provides the control of the mobile unit's transmitted signal power and/or duration in a manner to effect the reception of the transmitted signal at dynamically determined varying energy levels and/or multiple reception stations, for the enhanced performance of services that exploit the information obtained via enhanced signal energy or multi-site signal reception.

As realized and noted in the art for wireless communications systems, the control of a mobile unit's transmitted power is managed to accomplish sufficient signal reception at acceptable communications levels and/or at a single reception site. The intended single site is that of the serving cell, which cell is identified by its cell global identity (CGI). The power control objective for the management of the transmitted (Tx) power of the mobile station/user equipment (MS/UE) is to maintain sufficient received (Rx) signal power at the serving base transceiver station (SBTS) for acceptable wireless communications quality of service (QoS) or bit error rate (BER), while still minimizing the MS Tx power for reduced interference at neighboring (non-serving) cells and for reduced energy drain in the subject MS/UE. Thus the intent for the conventional Tx power control is to prevent energy drain exceeding that required for communications with the MS/UE and to prevent the possibility of multi-site interference reception, to the maximal extent possible.

Examples of the background art are available in the descriptions of the technology for various wireless communications systems. In North American Time Division Multiple Access (NATDMA) wireless communications systems, the MS/UE uses a maximal Tx power for its initial short-term access/control channel interactions with the SBTS, through which the MS/UE gains access to and is assigned the voice/traffic channel usage for its actual intended communications. At the initial onset of its usage of the voice/traffic channel or frequency band, the MS/UE may initially maintain its high Tx power to support SBTS power evaluation, but thereafter the SBTS commands the MS/UE to reduce its power to a minimal level that the SBTS evaluates is necessary for adequate communications QoS at its reception site. Since the reduced power level for the normal ongoing voice/traffic communications may be insufficient to support multi-site reception for those applications that require or benefit from such reception, the communications-centered Tx power management procedures often degrade or preclude the performance of associated or augmenting services. Such degraded service may include the wireless location service that supports the provision of location information to a public safety agent for response to an emergency call for help.

Another example of the background art for wireless transmission power control is presented in the descriptions of the technology for CDMA wireless communications systems. In North American Code Division Multiple Access (CDMA) wireless communications systems, the MS/UE initiates its transmissions at a minimal Tx power level above the background "noise" floor. If the MS/UE fails to establish connection with and response from its selected serving cell, the MS/UE progressively and incrementally raises its Tx power level until it reaches a level that is strong enough to obtain the necessary connectivity with its immediate SBTS. Thereafter, the SBTS aggressively, i.e., at a high repetition rate of signal quality evaluation and commanded re-configuration of the MS/UE Tx power parameters, manages the Tx power to maintain as precisely as possible the power that it (the SBTS) receives from the subject MS/UE and all other MS/UEs under its control. As with the TDMA transmissions, this communications power management is explicitly designed to achieve communications QoS only at the reception site of the serving cell, and otherwise is intended to minimize the associated "interference" level that would propagate from the subject MS/UE to any other neighboring cell sites. Again this logical communications-centered Tx power management approach is not conducive to or even supportive of the reception of adequate signal energy at multiple receiving sites for services that are adjunct to the communications service, but that require or would benefit from multi-site signal reception. (The CDMA air interface, as defined by EIA/TIA standard IS-95A (or its more recent version, i.e., CDMA 2000), is characterized by the use of both frequency and code separation. Because adjacent cell sites may use the same frequency sets, CDMA operates under very careful power control, producing a situation known as the near-far problem, thus making it difficult for most methods of wireless location to achieve an accurate location. (See U.S. Pat. No. 6,047,192, Apr. 4, 2000, Robust, Efficient, Localization System, for a solution to this problem.)

Although not described in sufficient detail for implementation, there have been previous "suggestions" for an overly simplified form for Tx power control in a wireless location system that augments a wireless communications system for emergency service response. Such suggestions were expressed in the publicly filed proceedings of the US Federal Communications Commission (FCC) over the course of its deliberations re Common Carrier (CC) Docket 94-102, which initially defined its Notice of Proposed Rulemaking (NPRM) to require wireless location support for emergency wireless communications in public mobile communications systems. In the 94-102 proceedings, including in the public's comments and reply comments, and in other related or associated documents, there have been a few expressions of the need to support multi-site signal reception for emergency wireless location determination through an infrastructure of location measurement units (LMUs). Based upon the realization that simultaneous multi-site signal reception is antithetical to the frequency sharing or reuse design of the standard public wireless communications systems, various suggestions for a simple, temporary power "spiking" for emergency calls were proposed to enable or enhance the infrastructure-based determination of the location of any wireless MS/UE involved in an emergency telephone call. Although such suggestions were not provided with any explicit descriptive teaching or exposition regarding how such power management should or could be implemented, the implied approach would support the required location determination through the use of a "maximum" Tx power level setting with a fixed maximal or unlimited time duration (i.e., the call duration) for the subject MS/UE.

U.S. Pat. No. 6,519,465 B2, Feb. 11, 2003, Modified Transmission Method for Improving Accuracy for E-911 Calls, describes that an E911 "trigger" may be stored in a phone and employed to cause the phone to transmit a special signal when the user dials 911. The special signal assists the WLS in locating the phone. See also, U.S. Pat. No. 6,463,290, Oct. 8, 2002, Mobile-assisted Network Based Techniques for Improving Accuracy of Wireless Location System. The '290 patent describes how the accuracy of the location estimate of a Wireless Location System is dependent, in part, upon both the transmitted power of the wireless transmitter and the length in time of the transmission from the wireless transmitter. Generally, higher power transmissions and transmissions of greater transmission length can be located with better accuracy than lower power and shorter transmissions. Recognizing that wireless communications systems generally limit the transmit power and transmission length in order to minimize interference within the communications system and to maximize the potential capacity of the system, several methods are described to meet the conflicting needs of both systems by enabling the wireless communications system to minimize transmit power and length while enabling improved location accuracy for certain types of calls, such as emergency calls. Such methods include mobile-assisted techniques in which the mobile unit includes functionality to assist in improving location accuracy. The WLS locates the mobile unit while the latter is using a modified transmission sequence comprising a message sent from the wireless transmitter using transmission parameters different from the normal transmission parameters broadcast on the forward control channel by the base stations in the associated wireless communications system. A trigger event, such as the user dialing 9-1-1, causes the mobile unit to operate in the mode in which the modified transmission sequence is used.

None of the background art suggestions for or descriptions of a dynamically adjusted Tx power level for the subject MS/UE integrate diverse sources of power-related information to evaluate and determine the optimal level and/or the optimal time (start and stop) duration for the Tx power of the subject MS/UE to enable accurate parametric characterization and/or multi-site signal reception. If the previously described pre-determined maximal power-level settings were to be routinely applied, the associated communication interference would be maximized at neighboring cell sites, and such interference would severely degrade the ongoing and subsequently ensuing communications that the communications system is intended to serve. Such Tx power management does not exploit the available real-time power-related information that could be used in an assessment of what signal power and duration could optimally serve the joint needs of minimal neighboring site interference and temporary multi-site location determination or enhanced signal parameter characterization. In fact, such an overly simplistic power-management approach for one MS/UE involved in an emergency communication would likely also interfere with the QoS performance for any other MS/UE attempting simultaneous or coincident emergency communications under the control of the same SBTS, let alone those MS/UEs operating under the interference-plagued control of neighboring cells. In order to mitigate the degradations in communications performance that can occur when a MS/UE transmits at an uncontrolled maximum power level, effective use of the current power-related information in the present invention can potentially optimize the performance of the communication system without precluding the signal characterization and/or source location determination associated with other augmenting system services.

In contrast with the background art, including that referenced above, the technology disclosed below integrates and exploits the information of various types, particularly real-time location- or distance-related measurements and measurements of currently received power, to support a selected MS/UE Tx power level that is derived to meet the specific immediate need for temporary enhanced-level and/or multi-site reception and signal parameter extraction. The inventive technology also enables and supports the "continuous" ongoing re-evaluation of the appropriate MS/UE Tx power level to the extent needed for the ongoing support of relevant services.

SUMMARY

The following summary provides an overview of various aspects of exemplary implementations of the invention. This summary is not intended to provide an exhaustive description of all aspects of the invention, or to define the scope of the invention. Rather, this summary is intended to serve as an introduction to the following description of illustrative embodiments.

To provide enhanced performance for the augmented services enabled with wireless communications systems, the present invention provides the technology for effectively and dynamically controlling the transmitted signal power emitted by the wireless mobile units through the exploitation of diverse specific information and data sources. For example, in one presently preferred implementation of the invention, the accuracy of wireless location determinations can be significantly enhanced through real-time management of the mobile unit's transmitted signal power to effect the reception of the signal at an increased number of sites equipped with location measurement units.

One embodiment of the inventive method includes the step of controlling an RF signal characteristic for a signal transmitted from a mobile station to support an augmenting service associated with a wireless communications system. This exemplary method includes the step of collecting real-time and/or previously stored data or information (the terms data and information being used synonymously herein) related to current or expected values for the signal characteristic. In addition, the method includes evaluating the collected data to derive a characteristic-dependent expected measure of effectiveness for the expected performance of the augmenting service, and determining an optimal value for a signal characteristic to support the augmenting service. This optimal value may then be used in controlling the mobile station's transmitted signal.

These and other innovative approaches of the present invention for enhanced wireless transmitted power control are presented in the detailed description that follows.

BRIEF DESCRIPTION OF THE DRAWINGS

The foregoing summary, as well as the following detailed description, is better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION OF ILLUSTRATIVE EMBODIMENTS

Overview

Figure 1:
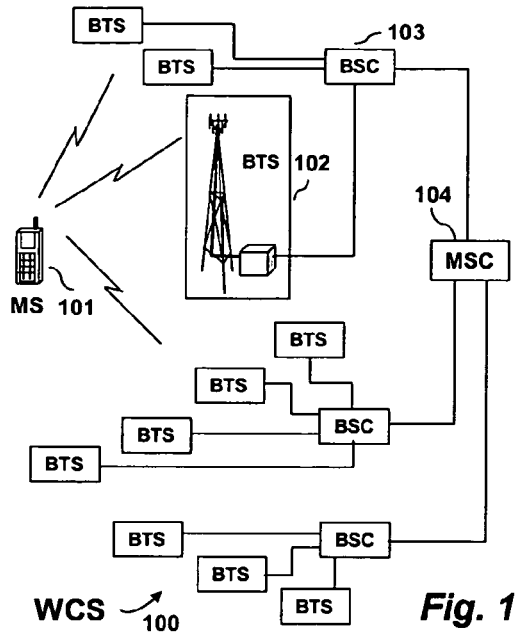
FIG. 1 depicts a representative configuration of the major components of a wireless communications system.

One presently preferred embodiment of the invention exploits the information capable of being provided in a standard or augmented wireless communications system to enhance the management of the power transmitted by the users' wireless mobile stations (MSs). The technology of the present invention enhances the power management to improve the performance of services extended through or adjunct to the communications facilities, while optimizing the operational battery life of the supported MSs. Examples of augmentation services that benefit from the dynamically derived optimal transmitted (Tx) signal power levels include those that exploit the benefits of accurate signal parameter characterization and/or signal source location determination.

As discussed above, one embodiment of the invention includes controlling an RF signal characteristic for a signal transmitted from a mobile station to support an augmenting service associated with a wireless communications system. This includes the step of collecting real-time and/or previously stored data or information related to current or expected values for the signal characteristic; evaluating the collected data to derive a characteristic-dependent expected measure of effectiveness for the expected performance of the augmenting service, and then determining an optimal value for a signal characteristic to support the augmenting service. This optimal value may be used in controlling the mobile station's transmitted signal. The optimal value may, e.g., be the nominal, communications-driven, starting power level if the evaluation indicates that it will support an acceptable location-determination accuracy; otherwise it may be the lowest increased level and duration that will achieve an acceptable predicted location accuracy. Moreover, the MS may then be provided with commanded power settings for its impending transmissions and use those settings, just as it has done in the past with the minimal level settings that support communications solely to the SBTS (i.e., serving base transceiver station).

In an illustrative embodiment of the inventive method, the signal characteristic is a member of the group consisting of the power level, the time duration, and the energy represented by the product of both, for the signal transmitted from the mobile station. Further, in this embodiment, the augmenting service is location determination. In the same or another embodiment of the method, the collected data includes at least one member of the group consisting of: a measurement of the power level for the downlink signal from a base transceiver station received at the mobile station; a measurement of the time of arrival or the time difference of arrival for a downlink signal from a base transceiver station received at the mobile station; a measurement of the round trip delay or the timing advance for the propagation of an RF signal over the two-way paths that include the downlink and the uplink directions between the base transceiver station and the mobile station; a measurement of the power level for the uplink signal from the mobile station received at a base transceiver station; a measurement of the time of arrival or the time difference of arrival for an uplink signal from the mobile station received at a base transceiver station; a measurement of the angle of arrival for an uplink signal from the mobile station received at a base transceiver station; a wireless communications system parameter specifying a power level commanded or set for the downlink signal as transmitted from a base transceiver station; a previous uplink location measurement attempt, which determines that the current power is inadequate, and estimates the amount of additional power which may be adequate; a wireless communications system parameter specifying a power level commanded or set for the uplink signal as transmitted from the mobile station; a theoretical, modeled, or empirically measured representation of the RF signal propagation loss between a base transceiver station and an approximated or estimated location for the mobile station; a theoretical, modeled, or empirically measured representation of the RF signal transmission and reception system gains for a signal path between a base transceiver station and an approximated or estimated location for the mobile station; an approximated or estimated location for the mobile station provided from a location determination process; and a measurement of communications system interference, quality of service, or bit error rate at a base transceiver station.

For an embodiment of the method that exploits any of the prior listed types of data or information to determine optimal signal characteristics that will enhance performance for location determination, the expected measure of effectiveness may include a representation of the expected location determination accuracy, which may include at least one parameter representing the expected uncertainty of the location error covariance matrix. For such an embodiment, the relevant parametric representation of the expected location uncertainty may include at least one member of the group consisting of the expected determinant of the location error covariance matrix, the expected trace of the location error covariance matrix, the combination of the determinant and trace, and the expected dilution of precision for the expected location determination. In deriving an optimal signal characteristic value for location determination, the determination of an optimal value may further comprise jointly assessing both the expected location measurement accuracy and the communications system quality of service or bit error rate expected from the impacts of the interference associated with candidate adjusted signal characteristics. For the flexible embodiment of the inventive method, the embodiment may further comprise the steps of exchanging the collected or the evaluated data between a wireless communications system and an augmenting service system; and sharing the processing for the evaluation or the optimal value determination between the processing facilities of a wireless communications system and an augmenting service system.

The inventive method and system may also include a processor which is programmed to receive collected data indicating the quality of the location measurement, and means for causing the mobile station to increase the power of its transmissions to enable a location estimate of adequate quality. This may be done iteratively, in a step-wise fashion, to ensure that the location estimate is of adequate quality.

Data indicative of the quality of the location estimate may include the number of location measurement units which are able to make a measurement, the geometry of the location measurement units, the quality of the measurement made by each of the location measurement units, or a combination of this data.

In an example of this method applied to a GSM network, a Serving Mobile Location Center (SMLC) may be requested provide a location by a Base Station Controller (BSC). The SMLC may request the channel information from the BSC, which is, in this example, required to perform an uplink TDOA (UTDOA) location. The BSC leaves the MS at the current power level, and provides the channel information for that mobile station to the SMLC. The SMLC then determines the location by collecting and time-stamping signals at many remote LMUs, computing the time difference of arrival of those signals, and using the time difference of arrival information to compute a location. For the location, the SMLC may compute an estimate of the accuracy of the location based upon the number of LMUs that were able to make a UTDOA measurement, and the geometry of those LMUs. If the estimated accuracy is less than a configured accuracy threshold, the SMLC returns the location. If the estimated accuracy is greater than or equal to the threshold, the SMLC may request the BSC to increase the power of the MS. The BSC increases the MS power, and the process of power increase and location may be repeated until a location is computed with an estimated accuracy below the configured accuracy threshold, or until the SMLC reaches some other decision point to stop further iteration, such as a maximum number of iterations, the expiry of a timer, reaching the maximum power, or others. At the end of the process, the SMLC delivers the final location to the BSC.

Detailed Description of Transmit Power Control

FIG. 1 depicts the components representative of a standard wireless communications system (WCS) 100. Although the technology represented in FIG. 1 is expressed with some of the terminology typical of a Global System for Mobile Communications (GSM) infrastructure, the technology is comparably applicable to implementations of cellular wireless communications in accord with standards such as those describing the Universal Mobile Telecommunications Service (UMTS) specified by the Third Generation Partnership Project (3GPP), the European Telecommunications Standards Institute (ETSI/3GPP) specified Global System for Mobile Communications (GSM), the North American Time Division Multiple Access (NA TDMA) service as specified in the Electronic Industries Association/Telecommunications Industries Association (EIA/TIA) Interim Standard (IS) EIA/TIA IS-136, the NA Code Division Multiple Access (CDMA) as specified in EIA/TIA IS-95, and even the "analog" Advanced Mobile Phone Service (AMPS) described in EIA/TIA IS-553. In FIG. 1, the wireless mobile communications unit or mobile station (MS) 101 communicates via a radio frequency (RF) link carrying transmissions to and from a base transceiver station (BTS) 102. A set of (typically three) BTS cell sectors (or sectorized cellular areas of operation) cover a localized communications area or cell (surrounding a serving BTS) served by the antenna(s) deployed at the BTS terminal location. A set of the various BTSs covering a broader operational region are controlled by a base station controller (BSC) 103. The BSC manages the MSs and BTSs operating within its domain, and this management includes the handover (HO) of the responsibility for the integrity of the RF link with a particular MS from one BTS to another, as the MS moves from the cellular coverage of the cells of one BTS to those of the other BTS. In a similar manner at a lower level of communications management, the BTS manages the HO of an MS from one of its own sectors to another. At a higher level of management, a mobile switching center (MSC) 104 manages a multiplicity of BSCs, including the management of the HO from one BSC to another for the communications with a MS. This management of the RF communications links covering localized operational areas or cell sectors of small domain is the essential mechanism by which the wireless communications system is able to serve a large number of MSs with a relatively small number of communications channels in a limited frequency band or spectrum, through frequency re-use among the MSs.

The shared use and management of the full communications spectrum allocated to a particular wireless communications system or carrier is significantly exercised through the limitation of the power transmitted by the served MSs. While commanding enough signal power to support service through the single appropriate BTS, the WCS suppresses or minimizes the transmitted power of the MSs so that their transmitted signals are "contained within" their assigned cells/sectors and do not excessively "leak into" and/or interfere with the communications in other cells/sectors. Other interference-mitigation procedures apply time-division multiple access (TDMA), whereby the MS and BTS transmissions are synchronized such that distinctly directed transmissions occupying a common frequency band or channel are scheduled to occur in distinct time slots; frequency-division multiple access (FDMA), whereby the MS and BTS transmissions are allocated among separate frequency channels such that distinctly directed transmissions in a common frequency channel are assigned to occur only in distinct serving cells with operational areas separated by sufficient distance to reduce co-channel interference to an acceptably low level; FDMA/TDMA with frequency hopping, whereby the potential impact of co-channel interference can be further mitigated by the assignment and use of distinct pseudo-random frequency-hopping sequences that specify distinct time-slot sequences enabling error-correction coding to correct received communications whose demodulations may be corrupted by rare co-channel interference during an occasional short-duration time slot interval; and code-division multiple access (CDMA), whereby the MS and BTS transmissions are encrypted (encoded and modulated) such that distinctly directed transmissions occupying a common frequency band or channel are uniquely coded to achieve minimal correlation between the signals of the distinct transmissions. Nevertheless, in any of such communications systems serving a large number of simultaneously transmitting MSs, the effective control of the signal power transmitted by each MS is essential to maintaining the quality of service (QoS) required for reliable communications.

For normal communications systems purposes, the standard strategy applied in the control of the MS's transmitted power involves the dynamic adjustment of the MS power so that it will be set to the minimal level that will support acceptable communications between the MS and the immediately serving cell site/sector, i.e., the serving BTS or the sector of serving cell global identity (serving CGI). This strategy serves two beneficial objectives: the energy consumption or power drain of the battery (energy source) in the MS is minimized, and the transmitted energy of the signal that propagates or "leaks" into the operational areas of neighboring cells/sectors and constitutes interference in those cells/sectors is minimized. The power control is dynamic in that it is "continuously" monitored and re-adjusted under the control of the serving BTS. That is, frequently or perhaps every few milliseconds (msec), the BTS may issue a command to the MS to set its transmitted power level to a selected value. This aggressive control of the transmitted power significantly reduces the signal power that propagates into neighboring cell sites.

While minimal MS signal power at all cells except the serving cell may be beneficial for the communications system, considered in and of itself, the performance of other required, requested, or otherwise beneficial services associated with the communications system facilities can be degraded or precluded by this standard power-control strategy. For example, such strategy may inhibit the performance of a location service, by which the location of the standard MS is determined based upon measurements of its signal characteristics received by location measurement units (LMUs) at multiple geographically distributed sites. Such degradation of the location service can be life-threatening when it occurs in conjunction with an emergency communication to public safety services. Additionally, the ability to dynamically support optimal HO communications decisions may be degraded when only a minimal set (e.g., two) of the BTSs can provide reliable measurements for the quality of the relevant MS signal receptions at the respective BTS locations.

Figure 2:
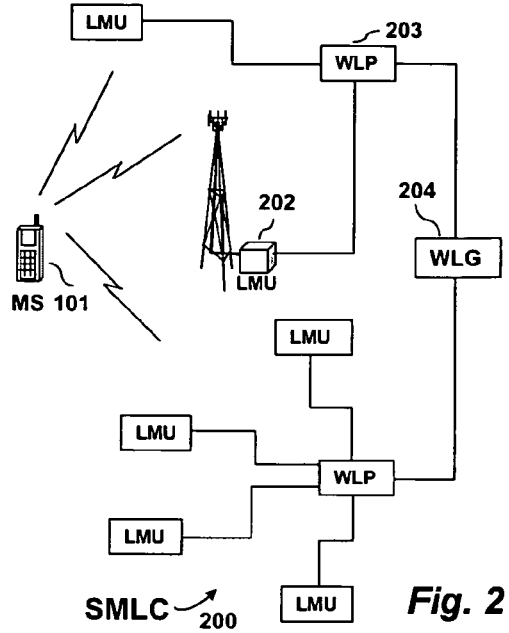
FIG. 2 shows a representative configuration of the major components of an overlay wireless location system, termed the serving mobile location center.

As presented in FIG. 2, a location-determination system that cooperates as an adjunct to a wireless communications system may be termed a Serving Mobile Location Center (SMLC) 200. (Note regarding terminology: In 3GPP GSM terminology, the term "SMLC" refers to the entire location determination system, whereas in other contexts "SMLC" refers to the sub-system component that is called the "WLP" (as in this description.) An infrastructure-based, or overlay, wireless location system or SMLC can be represented with the overlay configuration of components depicted in FIG. 2. In FIG. 2, the RF signals in the communications channel from the MS 101 of interest are received and measured by LMUs 202 that are deployed at locations distributed throughout the operational domain of the communications system. Typically, as may be visualized with the "overlay" of FIG. 2 on top of FIG. 1, LMUs 202 are deployed at BTS 102 facilities, and the LMUs usually tap their signals for the location-related measurements via multi-coupling to the same signal feeds that the BTSs use from the antennas deployed for the communications. As depicted in FIG. 2, the LMUs are not necessarily deployed one-for-one with the BTSs. The location-related measurements of the received signal characteristics extracted by multiple LMUs are managed and collected through wireless location processors (WLPs) 203, each of which directs the operations of multiple LMUs. The WLP oversees the selection of the particular LMUs that are tasked with providing the measurements for a particular MS of interest. Upon reception of the appropriately measured signal data, perhaps including through other WLPs managing LMUs not under its direct control, the WLP will typically also evaluate the data and determine the optimal location estimate based upon the data. Typically a WLP may manage the operations of LMUs covering a geographic region for which the corresponding communications services are provided by multiple BSCs. The wireless location gateway (WLG) 204 of the SMLC conducts overall control and tasking of the WLPs. The WLG is typically (but not necessarily) co-located with a MSC 104 (and may interface with it). The WLG interfaces with and exchanges location-related requests, information, or data with the multiple BSCs it serves within the communications system. The WLG validates the location-service requests, and disperses the location-determination results to authorized recipients.

Figure 3:
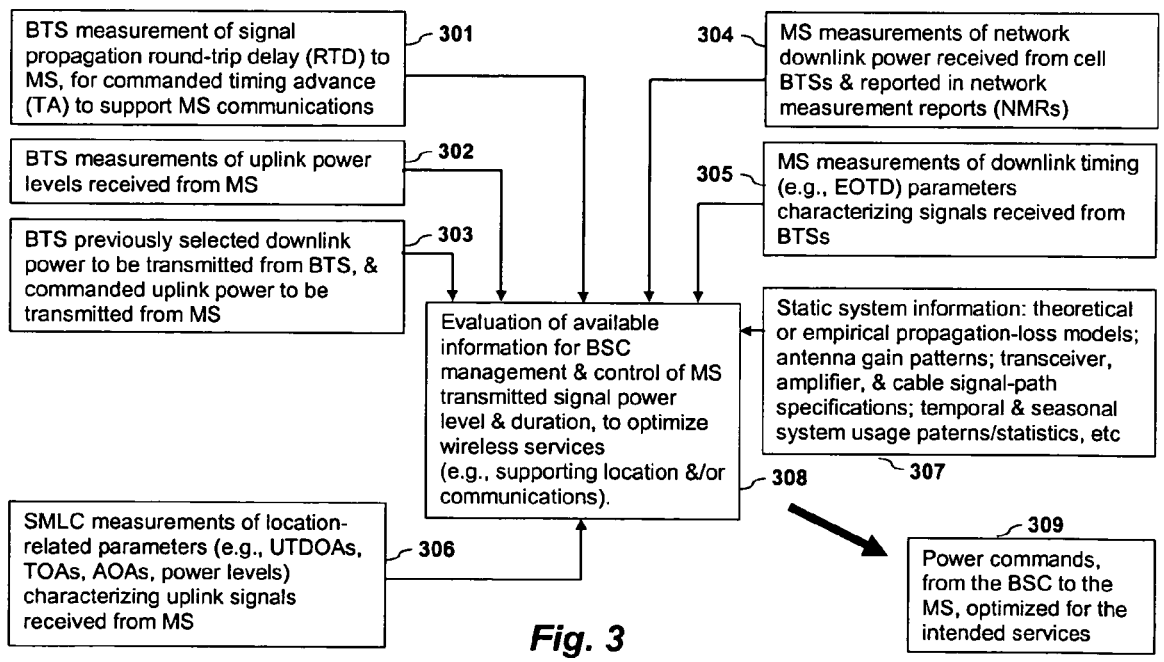
FIG. 3 illustrates use of various potential types and sources of information that are selected and applied in the present invention for the enhanced control of the mobile unit's transmitted signal power.
Figure 3A:
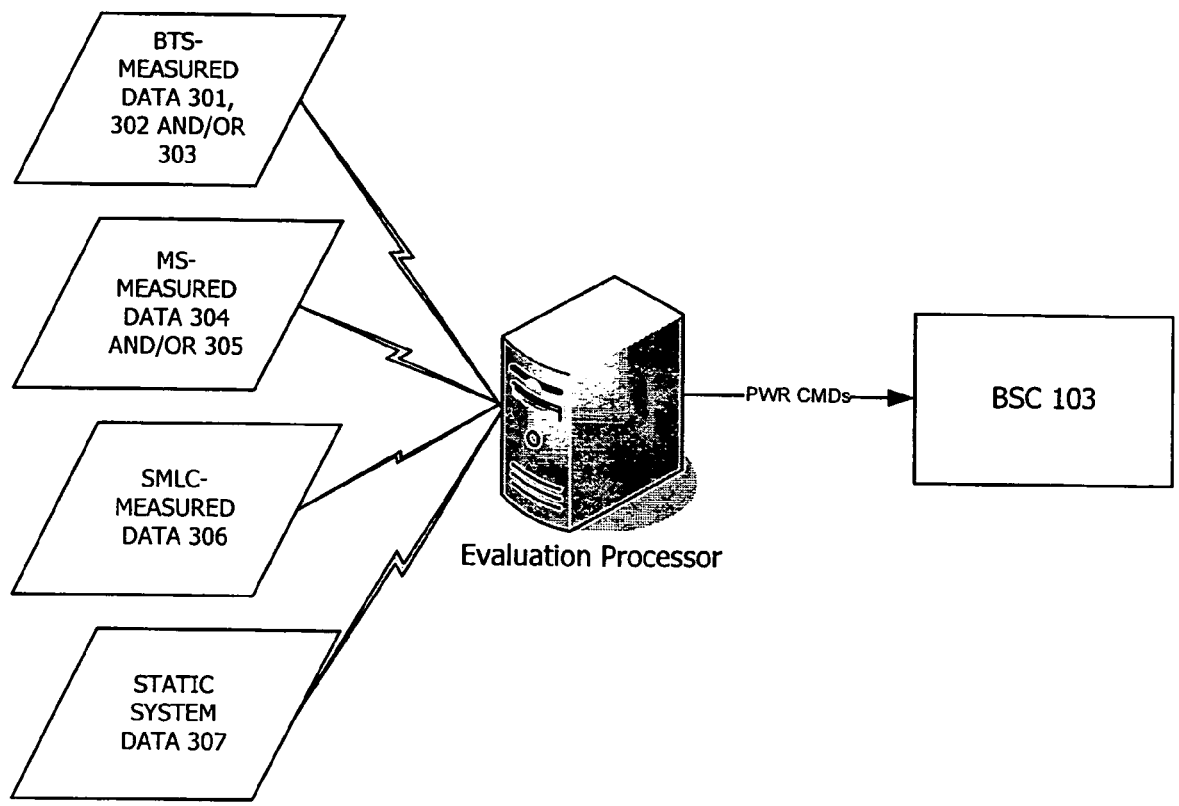
FIG. 3A illustrates a transmit power control system that employs the approach illustrated in FIG. 3.

In order to support the successful operation of services such as location determination and enhanced communications management, the technology of the present invention provides the mechanism through which enhanced power-control management can be conducted to optimally achieve adequate received signal power at sufficient or multiple LMUs or BTSs, while still maximally conserving the MS's available energy. As represented for a preferred embodiment in FIGS. 3 and 3A, the enhanced power control of the present invention is achieved through objective-driven analysis of diverse types of information, all of which can indicate the optimal transmission power level that the MS of interest should be directed to emit. Rather than simply select the minimum power level acceptable for communications with a serving-BTS, as occurs with the conventional power control in managing the wireless communications, the power control logic of the present invention exploits the relevant information that can be obtained from the BTSs, the BSC, the MS itself, or a SMLC to establish MS transmissions that serve both the communications and other desired augmenting services. FIGS. 3 and 3A provide exemplary illustrations of the use of various potential types and sources of information that are selected and applied in the present invention for the enhanced control of the mobile unit's transmitted signal power and/or duration. Through mathematical expressions such as described further below, all of these types of information relate to the current position of the MS of interest relative to the BTSs. Exemplary embodiments for the usage of these various sources and types of information for the optimal control of the MS transmitted signal energy or other characteristics are presented in the following descriptions.

For the example embodiments represented in FIGS. 3 and 3A, data from diverse types of data sources are exploited in support of an optimized value to be commanded for the MS transmissions. Most of the types of exploited information, e.g., 301-306, are dynamic in nature, changing as the signal conditions and the signal-propagation environment under which the MS is operating change.

BTS Measurements

In the conduct of routine WCS services, the serving BTS may obtain measurements 301 of the round trip delay (RTD) for signal propagation between itself and the MS of interest. Such RTD measurements may be routinely used to set the timing advance (TA) parameter that is sent to the MS to cause its communications transmissions to be received at the serving BTS in temporal synchronization with the transmissions received by the serving BTS for all of the other MSs currently operating under its domain.

In order to further support signal power management for the communications service at the immediately serving BTS, the serving BTS and perhaps neighboring BTSs may extract measurements 302 of the current power for the transmissions received from the MS of interest. The information available from such BTS-related measurements may also be augmented and interpreted in consonance with the current dynamic power-control settings 303 that the WCS may establish for the BTS downlink transmissions or for the MS uplink transmissions.

MS Measurements

Additionally, the MS may also provide measurements 304 and 305 of dynamic signal characteristics. Such MS measurements 304 may be provided in network measurement reports (NMRs) of the downlink signal power levels for the signals it currently has received from the serving BTS as well as neighboring BTSs. MS measurements 305 may also report the timing characteristics of signals received from BTSs, such as the Enhanced Observed Time Difference (EOTD) measurements that may be intended to support location determinations.

SMLC Measurements

Dynamic signal-characteristic information can also include SMLC data 306 obtained to directly support the determination of an accurate MS location. As described in the prior art for SMLCs, such data can include measurements of times of arrival (TOAs), (uplink) time differences of arrival ((U)TDOAs), angles of arrival (AOAs), or received signal power levels. Even when such data are inadequate to support determination of an acceptably accurate location estimate, the data available still support the evaluation of the adjustments in MS signal-transmission characteristics that could enhance the location determination performance. In particular, to the extent that such data are not available from an adequate quantity of supporting LMUs, the available data measurement accuracies and associated measures of relative signal and noise strengths indicate the increment in MS transmitted signal energy that would likely produce successful measurements from additional LMU sites.

Static Information

In the illustrative embodiment of the present invention, the management of the MS transmission characteristics for the enhanced performance of augmenting services optimally integrates such above-described dynamic information 301-306 together with relevant static information 307 that may represent deployed system characteristics and pertinent domain knowledge. Such static information could represent empirically derived signal-propagation loss models (as described further below), or equipment (e.g., antenna or electronic-signal-path gain) characteristics presented in manufacturers' technical specifications, or time-of-day or season signal- and interference-usage statistics as may be collected for WCS operations management and planning. For example, through the use of the static angular gain-pattern characteristics of the transmitting and/or receiving antennas, the evaluation of dynamically measured signal power levels and their interpretation in terms of the inferred propagation distances can be more accurately assessed when used with the application of a static representation of the signal propagation loss, as mathematically described below.

Evaluation and Optimization

As represented for the example embodiment of the present invention in FIG. 3, the evaluation 308 of available pertinent information can incorporate and integrate the dynamic representation 301-306 of the current operational conditions for the wireless transmissions together with static information 307 that can clarify an optimal interpretation of the dynamic data. The objective determination of optimal power and duration, or energy, settings for the MS transmissions is calculated to achieve enhanced and acceptable performance for the subject augmenting service, such as location determination, while adequately maintaining the wireless communications QoS. When the optimal transmission settings have been derived for the MS, the BSC provides them in control command message(s) 309 to the MS.

For the effective and accurate operation of the infrastructure of an overlay location system or other wireless services that exploit MS signal reception at multiple sites, the MS signal should be received at an adequate number of LMU or similar sites. As recognized in prior location-services (LCS) art, the minimum number of required measurement-supporting sites may theoretically be only one, two, or three, depending upon the particular type of location-related signal characteristic measurements that are extracted from the received MS signals. However, as represented in the statistical Fisher information matrix and discussed further below regarding its expression in relationship (13), the uncertainty covariance matrix representing the accuracy of the estimated location parameters is inversely proportional to the number of effectively applied independent measurements. Thus, since the uncertainty standard deviation or average estimation error is the square root of the corresponding variance, an example location accuracy can be two-fold enhanced through inventive management of the transmitted MS power to effect a four-fold increase in the number of cooperating LMU sites contributing measurements to the location calculations. In this manner, the robustness and accuracy of the location determination can be significantly enhanced through optimal power control.

However, as described above, the optimal strategy for control of the power transmitted by the MS should accommodate the impact of raised power levels upon the interference environment under which the communications services, as well as the location services, are provided. As noted above, a simple strategy for MS-power management from the communications viewpoint involves minimizing the power subject to the constraint that there must be enough power for the serving BTS to achieve communications at an effective QoS. Alternatively, a simple strategy for MS-power management from the location-determination viewpoint involves maximizing the power to achieve a maximum number of cooperating LMUs that can receive the signal with enough strength to extract reliable measurements of location-related signal characteristics. Since the maximum-power strategy conflicts with the needs to conserve MS energy for longer battery life and to suppress signal interference for better communications QoS, the present invention provides an optimized evaluation of dynamic measures related to the signal environment and to the current signal adjustment needs, together with relevant descriptive static information, in an assessment to achieve sufficient multi-site reception at the minimal necessary level.

Figure 4:
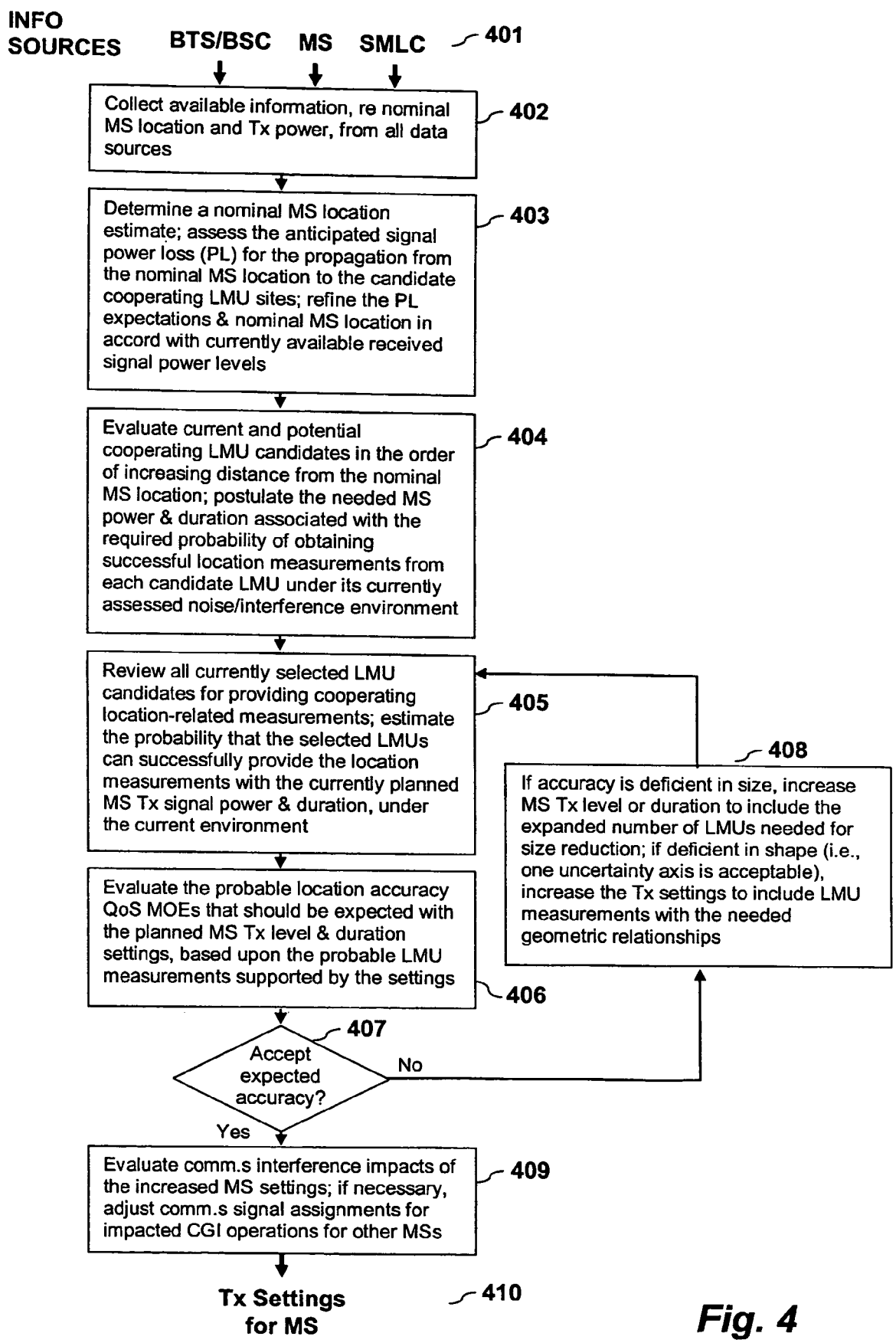
FIG. 4 presents an exemplary embodiment of the major functional components in the inventive power-control evaluation and selection for the enhanced performance of a wireless location determination service.

FIG. 4 represents an exemplary embodiment of the inventive evaluation procedure for the determination of an optimized set of MS signal-transmission settings to enhance the accuracy and robustness performance of an SMLC that augments the WCS services. As described above, the available information 401 input to the evaluation process includes dynamic and/or static data characterizing the current, real-time, operational signal and noise characteristics and conditions present under the WCS domain. To support the desired evaluation of the optimal MS transmission settings for services augmenting the WCS, the initiating data collection process 402 includes accessing the various sources of the applicable information, as described above. Since the calculations for the signal settings can be accomplished either in LMU facilities/components or in associated SMLC facilities/components, or can otherwise be shared between the processing resources of both such systems, the collection of the various types of information may include the request for and exchange of data between the WCS and its associated SMLC.

Based upon the data initially available, the performance prediction in the evaluation process begins with the preliminary calculation 403 of the nominal MS location that is inferred from that data. For example, based only upon the dynamic SBTS data which identifies the serving cell BTS and sector together with the static data indicating the cell antenna location and the sector angular orientation, the nominal location could be determined to be a sector "centroid" position that is one half of the distance from the BTS antenna to the position of the nearest-neighbor BTS border approximately along the sector boresight line of bearing. Typically a more accurate nominal MS location can be determined through a least squares, a maximum likelihood, or a maximum a posteriori calculation that integrates the inferred position sensitivity from the variety of measurements described above and represented mathematically in the position-dependent relations presented below. Thus in further example, even when the preliminary location calculation 403 is invoked in advance of the application of any SMLC processing, the available relevant measurements may still include distance-indicative measures of signal power levels, for BTS downlink signals received by the MS and for MS uplink signals received by any BTS or LMU. The technologies involved in the nominal location calculations are those that are described and applied in the prior SMLC art, including but not limited to the art cited above.

Based upon the nominal estimate of a location for the MS of interest, initial estimates 403 of the distance-dependent signal propagation losses for the propagation of the MS signal from its estimated location to the locations of candidate cooperating BTS and/or LMU reception sites may be derived through the mathematical relationships described below. For those sites from which signal power measurements are already available, the initial signal propagation loss evaluations 403 may be further refined in adjustment of the modeled propagation loss calculations to incorporate the actual impacts of the signal-path and signal-reception-equipment characteristics that the available measurements infer.

The anticipated performance evaluation 404 then applies the estimated signal propagation losses to assess the signal and noise conditions that would prevail at each candidate cooperating BTS/LMU site. To limit the number of needed cooperating sites, the sites may be analyzed in the order of increasing distance from the nominal MS location, progressing until an acceptable performance is anticipated. Based upon the postulated signal propagation loss and estimated noise level local to the reception site, the necessary transmitted signal level that would provide an acceptable measurement is calculated in accord with the mathematical relations for false-alarm or correlation-magnitude probabilities and thresholds presented below.

In an iterative assessment 405-408, the candidate MS transmission signal power and duration characteristics are evaluated for their potential contribution to the location-determination accuracy. For each candidate cooperating site, the "currently postulated" MS transmission settings are compared with those judged to be probabilistically required. The probability of the measurement success and acceptance, i.e., the probability of "detection," is represented in the statistical descriptions cited below. Through the applied relations, the evaluation 405 can determine the probability that the each candidate cooperating site could provide an acceptable measurement under the assessed signal and interference conditions local to the cooperating site.

Based upon the probabilistic availability of the hypothesized measurements, the anticipated location uncertainty covariance 406 may be calculated, as described in association with mathematical relation (13) below. In representation of the probability of threshold acceptance, the assessed uncertainty for a potentially available measurement can be scaled in its contribution to the Fisher information matrix prior to inversion. As represented in the mathematical relations below, the relevant probabilities and accuracies may be evaluated based upon the anticipated noise and received signal power or energy levels. Various measures of effectiveness (MOEs) can be used as described below to represent the location accuracy. The accuracy characterization of predominant interest will typically, but not necessarily, be in the two horizontal dimensions, since most of the potential measurements do not support vertical sensitivity. For example, if range-dependent timing measurements are available from the MS processing of signals received from orbiting satellites, then vertical sensitivity may be derived. Otherwise, the positional sensitivity that derives from the land-based signals generated or received by the MS will be predominantly confined to the horizontal domain.

The anticipated location accuracy 407 is compared for acceptance with the required performance threshold.

When the anticipated location accuracy is not acceptable in accord with the performance criteria, the nature of the performance deficiency 408 is evaluated. For example, if the volume of uncertainty has nearly equal extent in all required dimensions and essentially exceeds the acceptable performance limits, then the uncertainty should be reduced in all dimensions. Reduction of the uncertainty by approximately equal factors in all dimensions may require either the addition of measurements from additional cooperating sites that are distributed in angular directions that are uniformly distributed around the MS location, or the proportional reduction in the uncertainties of essentially all of the current measurements, or both. As represented with the mathematical relationships described below, either or both approaches to uniformly reduced uncertainties can occur with a postulated increase in the MS transmitted power or energy, in scenarios for which the uncertainties are not dominated by multipath spreads. If multipath spreading is the dominant source of uncertainty, then increased MS power or energy will still reduce the integrated uncertainty through the addition of more surrounding cooperating measurement sites, but the increased energy will not reduce the uncertainty of the current individual measurements.

Alternatively, if the location uncertainty 408 is only excessive for a subset of the required dimensions and otherwise meets the requirements in at least one dimension, then only those additional measurements that will reduce the uncertainty along the excessive dimension axes are needed. Thus in accord with the geometric sensitivities expressed with the mathematical relations described below, the increase in potential signal power or energy can be directed exclusively at the objective-driven need to acquire additional and/or improved measurements of the types and from the sites that have the geometric ability to reduce the uncertainty along the deficient axes. For example, if a two-dimensional uncertainty ellipse is excessively large along one particular axis, then its uncertainty along that axis can be preferentially reduced by adding improved T(D)OA measurements from sites with baselines distributed along or closely parallel with the excessive axis direction, and/or by adding improved AOA measurements from sites distributed along the perpendicular axis direction. Either form of preferentially targeted measurements will contribute to the reduction of the location uncertainty along the deficiently excessive axis.

When the iterative performance prediction is judged to be acceptable under the required performance criteria, then a final evaluation 409 examines the interference impacts of the potentially raised power or energy level for the MS of interest. The raised levels may meet location performance requirements without significantly degrading the anticipated communications QoS, if the levels for the other MSs served in the same SBTS have sufficient signal strength margin. If however the communications QoS does appear to be unduly degraded by initial determination, then mitigating procedures can be invoked to alleviate such effects. In the simplest of examples, if the signal strength for the MS must be raised in order for its signal to provide acceptable measurements at neighboring sites, then simply raising the temporary signal strengths of all other MSs currently served by the same SBTS would maintain essentially the same relative signal-to-interference ratio in their commonly shared SBTS, but could provide enough signal strength for the MS of interest to achieve an acceptable level in neighboring sites for cooperating location-determination measurements. Alternatively, communications service for MSs that are adversely impacted by raised strengths for the MS signal of interest may be able to be handed over to neighboring CGIs for continuing service. In still another approach with communications systems that operate with time-slotted communications data packet bursts, the scheduling of time-slot usage or frequency-hopping patterns for the raised levels of interest can be coordinated with those for other served MSs in the same SBTS domain, to mitigate potential interference impacts as described for generic WCS operations above. Such communications performance predictions and adjustments may be accomplished through the integrated assessment of the current operational usage underway in the serving and neighboring CGIs.

When the optimal settings have been determined for the desired transmissions from the MS of interest, these setting characteristics 410 are commanded in messages to the MS. Upon receipt of the signal transmission directives, the MS may implement its signal transmissions at the start and stop times and with the power level(s) dictated in the command message(s).

Mathematical Relationships

The accuracy of the location determinations provided by an SMLC is determined by several characteristics of the MS signals received by the SMLC's LMUs. As noted above and described below for relationship (13), the number of receiving LMUs is important in achieving the objective accuracy, and is critical when stressed near the lower limit needed to obtain any result at all. Additionally, relative geometric positioning of the cooperating LMUs providing measurements for the location calculations is equally significant to the LCS performance. In general, a measurement "z" of a characteristic MS signal parameter "h( )" can be expressed in a functional relationship involving the position $\underline{x}_{MS}$ of the transmitting MS and the position $\underline{x}_{BTS}$ of a receiving BTS or LMU with the addition of measurement noise "v":

$$z = h(\underline{x}_{MS}, \underline{x}_{BTS}) + v \qquad (1)$$

For the determination of location coordinates in two horizontal dimensions, at least two independent measurements must be obtained for the calculation. In the WCS domain, the positions of MSs and BTSs are represented by three-dimensional coordinates (i.e., latitude, longitude, and altitude) even though the available measurements typically only enable determination of location in the two horizontal dimensions of latitude and longitude. Typically, more than such minimal number (two) of measurements must be integrated into the location determination for a reliable, accurate result with acceptable or useful confidence. Thus the general relationship that is exploited for a MS location determination can be expressed as one for a M-row by 1-column vector $\underline{z} = (z_1, z_2, \ldots, z_M)^T$ formed from the multiple (i.e., "M") individual measurements of the available set $\{z_m | m=1, \ldots, M\}$:

$$\underline{z} = \underline{h}(\underline{x}_{MS}, \underline{x}_{BTS}) + \underline{v} \qquad (2)$$

where the function $\underline{h}(\ )$ is a vector-valued function of the multidimensional location-parameter vectors, and the noise vector $\underline{v}$ represents the set of noise contributions that distinguish the actually obtained measurements from the theoretically exact relations expressed with $\underline{h}(\ )$.

Various potential measurement parameters can be expressed in different functional relations to the relevant parametric position vectors. An example measurement-related parameter is the distance $D_{MS\_BTS}$ between a MS and a BTS:

$$D_{MS\_BTS} = |\underline{x}_{MS} - \underline{x}_{BTS}| \qquad (3)$$

where $|(\Delta \underline{x})|$ represents the magnitude or length of the Cartesian vector difference $(\Delta x)$ between the relevant (RF antenna) positions. Most directly, the time difference $t_{TR}$ of signal propagation between the times of transmission $t_T$ and reception $t_R$ is related to the distance between positions of transmission and reception, through the relation:

$$t_R - t_T = D_{TR}/c = |\underline{x}_T - \underline{x}_R|/c \qquad (4)$$

where "c" is the speed of RF signal propagation (i.e., the speed of light), and $x_T$ and $x_R$ are the positions of transmission and reception, respectively. For example, when a BTS measures the round-trip delay (RTD) to evaluate the timing advance (TA) that should be commanded to an MS for time alignment of its receptions at the BTS, the RTD or TA is directly related to the distance of signal propagation from the controlling BTS to the MS of interest, and back. I.e., the MS senses a signal transmitted from a BTS, synchronizes itself to this signal, and emits a responding transmission in cooperative time alignment that is sensed at the BTS. Since the round-trip delay (RTD), i.e., the received, round-trip, timing alignment offset sensed at the BTS, excluding any MS response circuit delay, is approximately proportional to the two-way propagation time between the MS and the BTS, the $TA_{MS}$ is set to this offset and is directly related to twice the location-related propagation distance, $D_{MS\_BTS}$, between the MS and BTS locations:

$$TA_{MS} = 2D_{MS\_BTS}/c = 2|\underline{x}_{MS} - \underline{x}_{BTS}|/c \qquad (5)$$

Alternative time-based distance-related measurements involve a (uplink) time difference of arrival ($TDOA_{12}$ or $UTDOA_{12}$) between the times of arrival (TOAs) for a common MS transmission arriving at two different BTSs;

$$\begin{aligned} TDOA_{21} &= TOA_2 - TOA_1 \qquad (6) \\ &= (TOA_2 - TOT) - (TOA_1 - TOT) \\ &= (D_{R2} - D_{R1})/c \end{aligned}$$

-continued $$= \begin{bmatrix} |\underline{x}_T(TOT) - \underline{x}_{R2}(TOA_2)| - \\ |\underline{x}_T(TOT) - \underline{x}_{R1}(TOA_1)| \end{bmatrix} / c$$

where $TDOA_{21}$ is directly related to the difference in signal propagation distances, $D_{R2}$ and $D_{R1}$, and does not require exact coordinated knowledge of the relevant (or equivalent) time of transmission, TOT. Similarly an enhanced observed time difference (EOTD) measurement involves the difference in times of arrival for signals from different BTSs received by a MS.

In a less sensitive or less accurate relation to position, the distance that an RF signal propagates between positions of transmission and reception is directly related to the loss in propagating signal power between those positions. The distance-related, measured, power level of a received signal is reduced from its transmitted level by a loss factor, $L_{TR}$, for its propagation as emitted from the transmitter and sensed by the receiver. With the use of assumed or known values for other related, contributing factors, this loss factor can provide a measure of the signal propagation distance, $D_{TR}$, through a modeled representation of the propagation environment:

$$S_T/S_R = L_{TR}(D_{TR}, \ldots) = G \cdot PL(D_{TR}) = G \cdot PL(|\underline{x}_T - \underline{x}_R|) \quad (7)$$

where the $S_R$ and $S_T$ measurements are the received and transmitted signal power level measures, G is a distance-independent factor encapsulating other contributing factors such as receiving and transmitting antenna "system" gains in the relative directions of signal propagation, and the propagation loss PL( ) is a distance-dependent model of the environmental path losses for the propagating signal strength between the deployed transmitting and receiving antennas. For a simple, spherical-spreading model, the "theoretical" propagation path loss is $$PL\mathrm{sph}(D_{TR}) = [4\pi D_{TR}/\lambda]^2 \quad (8)$$

where $\lambda$ is the wavelength of signal propagation. For the determination of a MS location with power levels measured for land-based propagations between an MS and one or more BTSs, the location calculations can make effective use of an empirically validated propagation loss model such as Hata's representation of data presented by Okumura, et al., as documented in the following article: *Empirical Formula for Propagation Loss in Land Mobile Radio Services*, M. Hata, IEEE Trans. Veh. Tech., Vol VT-29, No. 3, August, 1980.

Due to vagaries in environmental and multipath propagation conditions, empirical measurements of power levels conform with more nearly normal or Gaussian distributions when quantified in logarithmic units of deciBells (dBs). Thus the multiplicative factors in the expressions for PL( ) of Hata and other such models are typically represented as additions and subtractions of logarithmic terms. In particular, the loss model of relation (8) can associate the dB loss expressed in terms of the location-dependent distance to the measured dB difference between transmitted and received power levels. When expressed in dB units, the spherical spreading relation indicates that the propagation loss is proportional to the logarithm of the transmitter-to-receiver distance or "range (R)" multiplied by the factor 20. In Hata's empirical determinations of the appropriate factors for representing Okumura's measurements in typical WCS frequency bands, the multiplying factor for the "log(R)" scaling in urban environments is typically ~35. Alternatively, if available or determined by field measurements for any particular LMU or CGI site of interest, a CGI-specific representation of the propagation loss as a function of distance, and possibly (in certain circumstances) AOA, can be used instead of the generic Hata representation.

Any of these applicable propagation loss relations, in "linear" or "dB (i.e., logarithmic)" form, can be directly applied for associative evaluations of signal propagation distances. E.g., they can used to evaluate the transmitted MS power that is required for the signal to arrive at a selected BTS with a desired signal level when emitted from a known or estimated MS location. Similarly such relation can be used to assess the level of signal interference received at a subject BTS when the emissions arrive from an "interfering" MS of known or estimated transmitting position and power level. Additionally such relation can be asserted for location determination when the transmitted power level is known by command control from the affiliated communications system. Even when a transmitted level is not known or available from measurement, the ratio of received levels for the common transmitted signal that is received by two separate receivers can be exploited as a measure related to the ratio (or dB difference) for the two position-dependent distances between the transmitting and the receiving stations. The power level ratio or dB difference is adjusted for gain factors specific to each reception location. Such use of received power ratio or dB difference does not require available information regarding the common transmitted power level. With the modeled distance dependencies, including logarithmic expressions, MS location-dependent information can be extracted for transmissions from one or more BTSs to a MS and/or from a MS to one or more BTSs.

As still another form of location-related measurement, an angle of signal arrival (AOA) can be evaluated for a MS transmission that arrives at a BTS equipped with an LMU that is capable of deriving angle characteristics from the received signal. Such an AOA does not directly involve distance-related dependencies. An AOA may be typically represented as the angle of the direction from the point of reception toward the incoming signal, quantified relative to the known fixed direction of true, geodetic North. This relation may be expressed as $$AOA_{TR} = a \tan 2[(\underline{x}_T - \underline{x}_R)_E/(\underline{x}_T - \underline{x}_R)_N] \quad (9)$$

where atan2[ ] provides the complete four-quadrant arctangent, and $(\ )_E$ and $(\ )_N$ represent the East and North components for the vector directed toward the transmitter location $\underline{x}_T$ from the receiver location $\underline{x}_R$. Such a measure provides information regarding (and is sensitive to) the locus of the possible or probable transmitting MS locations along the line of bearing (LOB) sensed at the receiving land station (LS). The AOA measure is nominally independent of the distance along the LOB from the LS to the MS location (as is evident in the ratio of the vector difference coordinates, which ratio relatively cancels any distance sensitivity).

As mentioned above, the achievable location accuracy that can be derived with the above geometric relationships that are present for the multiple measurements exploited for a location determination are represented in the vector function $\underline{h}(\ )$. In a simple example, if the measurements available for a location determination are all distance-related measurements and all of the BTSs or LMUs contributing measurements are aligned along a single straight line, then the information available only represents a linear geometry (i.e., along that line) and no information is available to determine on which side of the line the MS is located. For this simple example, at least one distance measurement from an LMU displaced off of the symmetry line would be required to unambiguously locate the MS in the second dimension, i.e., in the direction perpendicular to the line. Alternatively, if in addition to the distance-related measurements a measurement of the AOA from a BTS to the MS is integrated into the location calculations, then such additional measurement would break the linear symmetry and would provide resolution of the side-to-side ambiguity. Thus all of the geometric significance of the available measurements is incorporated in the accuracy sensitivity of the location determination process.

Under normal statistical assumptions, the optimal location accuracy that can be expected from the use of measurement data involving a multiplicity of BTSs can be evaluated with the relevant observation relations, such as those presented above. The function $\underline{h}(\ )$ is intended to accurately represent the true association between the data and the desired location state parameters. Thus the expectation value, "E( )," for the noise is zero (i.e., the noise is unbiased) and, under normal assumptions, the observation uncertainties are represented by a Gaussian covariance matrix, R:

$$E(\underline{v})=\underline{0} \text{ and } E(\underline{v}\underline{v}^T)=R \tag{10}$$

Examples of the signal-level-dependent accuracies or uncertainties achievable for various types of location-sensitive measurements are described below. The sensitivity of the data vector to the parametric values in the MS position vector $\underline{x}$ is expressed in the sensitivity matrix H( ):

$$H(\underline{x})=\partial \underline{h}(\underline{x})/\partial \underline{x}=\partial_x \underline{h}(\underline{x}) \tag{11}$$

where the matrix function H( ) of the vector variable $\underline{x}$ is a M-row by N-column matrix function when evaluated for a measurement vector of M measurements and a state vector of N dimensions. Typically a location determination derives the least-squares solution for the position vector values $\underline{x}_{MS}$ for which the chi-square $\chi^2(\underline{x}_{MS})$, formed for the available measurement vector $\underline{z}$ from the residual vector $\underline{r}(\underline{x}_{MS})=\underline{z}-\underline{h}(\underline{x}_{MS})$ is minimized or the likelihood or a posteriori probability is maximized. For any candidate location vector $\underline{x}$, the chi-square is evaluated as:

$$\chi^2(\underline{x})=\underline{r}^T(\underline{x})R^{-1}\underline{r}(\underline{x})=(\underline{z}-\underline{h}(\underline{x}))^T R^{-1}(\underline{z}-\underline{h}(\underline{x})) \tag{12}$$

With normal or Gaussian measurement uncertainties, the optimal location uncertainty covariance matrix P that can be expected from such associated location evaluations would be $$P=[H^T(\underline{x}_{MS})R^{-1}H(\underline{x}_{MS})]^{-1} \tag{13}$$

where the N-by-N dimensional covariance matrix P, which is the Fisher-information-matrix inverse, expresses the uncertainties anticipated for the MS location estimate $\underline{x}_{MS}$. E.g., P is a 2-by-2 matrix function when the estimated location state vector is for the two horizontal state parameters, latitude and longitude. The location accuracy represented in the information inherent in the estimated location error covariance matrix P can be expressed in various summary measures of effectiveness (MOEs). As one scalar "measure" of the uncertainty "volume," the total (horizontal) uncertainty area A can be expressed with the determinant of the horizontal covariance matrix P through the relation:

$$A=\pi\text{sqrt}\{\text{Det}(P)\} \tag{14}$$

where sqrt { } evaluates the square root function for the scalar determinant Det( ) of the 2-by-2 covariance matrix. Other rotationally invariant scalar measures of the uncertainty, including the values for the two-dimensional (2D) semi-minor and semi-major axes of the uncertainty ellipse, can be formed from the uncertainty covariance parameters through various combinations of the trace and the determinant of the 2-by-2 covariance. The expression (13) for P also discloses the fundamental relation by which the uncertainty covariance can be seen to be inversely proportional to the number of contributing measurements, since the matrix products merely produce a sum over the M contributing measurements when the measurements have uncorrelated covariances (i.e., when R is diagonal). For an alternative evaluation of the accuracy implications for a (potentially) contributing LMU site, all measurement relations and their associated partial derivatives in the sensitivity matrix could be appropriately scaled to common units, e.g., distance. As examples, timing measurements can be scaled by the signal-propagation speed (of light) c, and angle measurements can be equivalently scaled to transverse projections by the appropriate signal propagation distances. Then, a standard parameter that effectively represents the degree to which the geometric relations among the MS and BTS positions integrate together to form a well estimated location can be expressed as the (unit-less) scalar (horizontal) dilution of precision HDOP (e.g., when the measurement data only support sensitive determination of the horizontal parameters):

$$\text{HDOP}=\text{sqrt}\{\text{Trace}([H^T(\underline{x}_{MS})H(\underline{x}_{MS})]^{-1})\} \tag{15}$$

where sqrt { } evaluates the square-root function for the scalar trace of the relevant 2-by-2 matrix-product inverse. Generally, when comparable measurement accuracies can be expected for LMUs at most or all of the potential sites, then the location accuracy will be optimal if measurements can be obtained that involve LMU sites that are deployed in (approximately) uniformly distributed directions surrounding the nominal operational area anticipated for the MS of interest.

As represented by the example in FIG. 4, the MS transmission power control considerations are driven by the objectives for enhanced services performance, particularly the performance of the augmenting location-determination service. Through the use of such accuracy relations as described above, the preferred embodiment of the optimal power-control evaluation in the present invention takes into account the benefit in accuracy performance that would accrue with incorporation of the measurements that could potentially be obtained through the adjustment of the MS's transmitted power to a level that could provide reliable measurements from an LMU at a candidate (BTS) location. When the normal calculation of a MS transmission level for the management of the WCS\communications does not support sufficient reception at enough LMU sites to produce a reliable location determination, then the optimal power-control calculations of the present invention will assess an optimal alternative MS transmission power level that enable the location determination to include additional measurements from an acceptable number of optimally beneficial LMU sites. With the postulation of a candidate MS signal characteristic power level, the impact of the characteristic power level upon the location accuracy can be evaluated as described above. Using a nominally representative location for the MS, the propagation loss to each candidate LMU site can be calculated. Then the anticipated signal-to-noise power ratio for a candidate site can be evaluated. Based upon the signal processing techniques anticipated for the location measurement extraction and for the wireless communications, the expected location measurement accuracies and communications interference impacts can be assessed.

A prime example of the potential benefit for a dynamic, location-driven assessment of the optimal power and duration for a MS signal occurs when a MS is used for an emergency communication as it approaches geographically near to its serving BTS. In short-range, close proximity to the SBTS, the standard communications power control would significantly reduce the commanded transmission power of the MS. This may typically reduce or preclude the reception of the MS's signal at any other site than that of the SBTS, thereby potentially precluding the ability to determine the MS's location in what could be a critical situation.

Since the accuracy or the expected variance of standard signal-characterization processing is inversely related to the total received signal energy exploited in the measurement process and is directly related to the locally received noise and interference signal power, the power-control technology of the present invention may optimally examine and determine an alternative signal power level and an associated time duration, which together can result in effective and enhanced location-related or other relevant measurements. Standard statistical descriptions express the normal expectations for results that accrue from acceptance thresholds, location-related parametric measurement accuracies, and communications bit- or symbol-error rates or probabilities of error, in their dependencies upon the total signal energy and the noise and interference power that impact the respective forms of signal processing.

As described in *Detection, Estimation, and Modulation Theory, Part I*, H. L. Van Trees, sec. 2.2.1, John Wiley & Sons, 1968, a likelihood ratio test or a constant false alarm rate (CFAR) acceptance threshold may be evaluated for the determination of whether a candidate measurement would be selected for contribution to a location calculation. Since the signal processing that forms the basis of the extracted signal characteristic measurements optimally involves signal correlation techniques, the applicable acceptance threshold conforms with the statistics of correlation or coherence probability distributions, as described in *Estimation of the Magnitude-Squared Coherence Function Via Overlapped Fast Fourier Transform Processing*, G. C. Carter, C. H. Knapp, and A. H. Nuttall, IEEE Trans. Audio and Electroacoustics, vol. AU-21, No. 4, August, 1973, pp. 337-344, and *Statistics of the Estimate of the Magnitude Coherence Function*, G. C. Carter, C. H. Knapp, and A. H. Nuttall, op. cit., pp. 388-389. The standard representation of a complex correlation $\gamma(\tau)$ [or similarly a coherence $\gamma(f)$] statistic can be expressed as:

$$\gamma(\tau) = \frac{\int_{-T/2}^{T/2} z_1(t) z_2 *(t+\tau) dt}{\sqrt{[\int_{-T/2}^{T/2} |z_1(t)|^2 dt][\int_{-T/2}^{T/2} |z_2(t+\tau)|^2 dt]}} \quad (16)$$

where $z_n(\ )$ represents a complex signal (or spectral) sample. Then, by example from the cited Carter, et al., articles, the cumulative probability distribution for the noise-only (i.e., false-alarm) statistics can express the probability of a false alarm exceeding a threshold value $|\gamma|^2$, e.g., for a CFAR detector, as:

$$P_{FA}(|\gamma|^2) = [1-|\gamma|^2]^{TB-1} \quad (17)$$

where TB is the time-bandwidth product representing the number of independent samples integrated for the correlation evaluation. In these evaluations, under the hypothesis of signal presence with adequate SNR, the candidate signal level is approximately related to the expectation for the correlation magnitude squared by the relation:

$$|\gamma|^2 = SNR_1 SNR_2 / [(1+SNR_1)(1+SNR_2)] \quad (18)$$

where $SNR_n$ represents the ratio of the signal-to-noise power levels for the two signals that are cross-correlated. When one of the correlated sample sets is a matched replica with an essentially infinite SNR, then the above expression can be assessed as $|\gamma|^2 = SNR/(1+SNR)$ using "SNR" for the other (finite) ratio. Through the application of such a correlation-based threshold, a candidate signal power level can be assessed relative to the estimated noise power level to determine whether it would yield an acceptable correlation-based measurement.

When a candidate signal power level is judged to provide an acceptable measurement, the potential contribution of its derived parametric accuracy to the location-determination accuracy can also be evaluated based upon the signal-strength dependency of the accuracy. For example, expressions for optimal accuracies achievable for TDOA measurements are available in: *The Generalized Correlation Method for Estimation of Time Delay*, C. H. Knapp and G. C. Carter, IEEE Trans. Acoust., Speech, Signal Processing, vol. ASSP-24, no. 4, pp. 320-327, August 1976; and *Time Delay Estimation Via Cross-Correlation in the Presence of Large Estimation Errors*, J. P. Ianiello, IEEE Trans. Acoust., Speech, Signal Processing, vol. ASSP-30, no. 6, pp. 998-1003, December 1982. Such descriptions can be used to represent a standard deviation σ (i.e., square root of the variance) for an optimal ("whitened") correlation-derived TDOA τ as:

$$\sigma_\tau = \frac{\sqrt{3}}{\pi B} \sqrt{\frac{1-|\gamma|^2}{TB|\gamma|^2}} \quad (19)$$

where again B is the bandwidth and T is the integration time involved in the signal processing that produces the measurement. Note that, in this expression as in similar expressions in the following cited articles for other forms of measurements, the measurement accuracy is inversely proportional to the square root of the time bandwidth product multiplied by the received signal SNR. Typically, even in the presence of "interference," the interfering signals (e.g., with the flat spectral content of a digital communications signal) impact the measurement accuracy in approximately the same manner as "white" (e.g., thermal) noise, and thus need merely to be incorporated appropriately into the "SNR" evaluation. For the representation of uncertainty contributions due to multipath propagation effects, the power-independent multipath spread characteristic of the operational environment and of each type of measurement can be added in quadrature with the "noise" effects represented as above. For another type of measurement, expressions for optimal accuracies achievable for AOA measurements are available in the following articles: *A High Resolution Direction-of-Arrival Algorithm for Narrow-Band Coherent and Incoherent Sources*, J. A. Cadzow, IEEE Trans. Acoust., Speech, Signal Processing, vol. 36, no. 7, pp. 965-979, July 1988; *Bearing Accuracy and Resolution Bounds of High-Resolution Beamformers*, R. S. Walker, Int. Conf. Acoust., Speech, Signal Processing 1985 Proceedings; and *Optimum Passive Bearing Estimation in a Spatially Incoherent Noise Environment*, V. H. MacDonald and P. M. Schultheiss, Jour. Acoust. Soc. Amer., vol. 46, no. 1, pp. 37-43, July 1969. Additionally, expressions for optimal accuracies achievable for general parametric measurements even at low SNR are available in *Extended Ziv-Zakai Lower Bound for Vector Parameter Estimation*, K. L. Bell, Y. Steinberg, Y. Ephraim, and H. L. Van Trees, IEEE Trans. Info. Theory, vol. 43, no. 2, pp. 624-637, March 1997; and Detection, *Estimation, and Modulation Theory*, Part I, H. L. Van Trees, John Wiley & Sons, Inc., 2001, sections 2.4.2 and 2.4.3.

Finally, example expressions and associated derivations describing the communications symbol or bit error rate (BER) or probability of error, in dependency upon the ratio of received signal energy per bit to noise spectral density, are available in *Digital Communications Fundamentals and Applications*, B. Sklar, Prentice Hall, 2001, sections 4.7 through 4.9. The probability of error for the communications system is the parameter that determines the communication QoS. As described therein, the relevant expressions for probability of error under conditions of "white" Gaussian noise often involve the expression for the complimentary error function, erfc( ) or Q( ), for normal Gaussian statistics:

$$Q(x) = \frac{1}{\sqrt{2\pi}} \int_x^\infty e^{-u^2/2} du \qquad (20)$$

The appropriate expression for the probability of error is dependent upon the specific form of modulation that is applied in the subject communication system to convey the transmitted data. For example, a modern wireless "digital" communications system may use coherent detection of M-ary differential phase shift keying (DPSK) signals. The probability of error associated with a candidate signal power or energy level in such an example system is described in the cited reference as:

$$P_E(M) \approx 2Q\left(\sqrt{\frac{2E_s}{N_0}} \sin\frac{\pi}{\sqrt{2}M}\right) \qquad (21)$$

where $E_S$ is the transmitted energy per M-ary symbol, $E_S = E_b \log_2 M$ with $E_b$ as the energy per bit, and $N_0$ is the noise spectral density. Thus such an expression can also be seen as a function of the square root of the TB·SNR product since $E_S/N_9 = TB \cdot SNR$, where T is the time duration for a signal symbol waveform and B is the processed signal (and noise) bandwidth. With such SNR dependence for the communications QoS, the impact of raised signal power or energy levels can be assessed for acceptance and adjustment before being commanded to the MS of interest.

Citations to Wireless Location System Patents

TruePosition, Inc., the assignee of the present invention, and its wholly owned subsidiary, KSI, Inc., have been inventing in the field of wireless location for many years, and have procured a portfolio of related patents, some of which are cited above. Therefore, the following patents may be consulted for further information and background concerning inventions and improvements in the field of wireless location:

1. U.S. Pat. No. 6,876,859 B2, Apr. 5, 2005, Method for Estimating TDOA and FDOA in a Wireless Location System;
2. U.S. Pat. No. 6,873,290 B2, Mar. 29, 2005, Multiple Pass Location Processor;
3. U.S. Pat. No. 6,782,264 B2, Aug. 24, 2004, Monitoring of Call Information in a Wireless Location System;
4. U.S. Pat. No. 6,771,625 B1, Aug. 3, 2004, Pseudolite-Augmented GPS for Locating Wireless Phones;
5. U.S. Pat. No. 6,765,531 B2, Jul. 20, 2004, System and Method for Interference Cancellation in a Location Calculation, for Use in a Wireless Locations System;
6. U.S. Pat. No. 6,661,379 B2, Dec. 9, 2003, Antenna Selection Method for a Wireless Location System;
7. U.S. Pat. No. 6,646,604 B2, Nov. 11, 2003, Automatic Synchronous Tuning of Narrowband Receivers of a Wireless System for Voice/Traffic Channel Tracking;
8. U.S. Pat. No. 6,603,428 B2, Aug. 5, 2003, Multiple Pass Location Processing;
9. U.S. Pat. No. 6,563,460 B2, May 13, 2003, Collision Recovery in a Wireless Location System;
10. U.S. Pat. No. 6,546,256 B1, Apr. 8, 2003, Robust, Efficient, Location-Related Measurement;
11. U.S. Pat. No. 6,519,465 B2, Feb. 11, 2003, Modified Transmission Method for Improving Accuracy for E-911 Calls;
12. U.S. Pat. No. 6,492,944 B1, Dec. 10, 2002, Internal Calibration Method for a Receiver System of a Wireless Location System;
13. U.S. Pat. No. 6,483,460 B2, Nov. 19, 2002, Baseline Selection Method for Use in a Wireless Location System;
14. U.S. Pat. No. 6,463,290 B1, Oct. 8, 2002, Mobile-Assisted Network Based Techniques for Improving Accuracy of Wireless Location System;
15. U.S. Pat. No. 6,400,320, Jun. 4, 2002, Antenna Selection Method For A Wireless Location System;
16. U.S. Pat. No. 6,388,618, May 14, 2002, Signal Collection on System For A Wireless Location System;
17. U.S. Pat. No. 6,366,241, Apr. 2, 2002, Enhanced Determination Of Position-Dependent Signal Characteristics;
18. U.S. Pat. No. 6,351,235, Feb. 26, 2002, Method And System For Synchronizing Receiver Systems Of A Wireless Location System;
19. U.S. Pat. No. 6,317,081, Nov. 13, 2001, Internal Calibration Method For Receiver System Of A Wireless Location System;
20. U.S. Pat. No. 6,285,321, Sep. 4, 2001, Station Based Processing Method For A Wireless Location System;
21. U.S. Pat. No. 6,334,059, Dec. 25, 2001, Modified Transmission Method For Improving Accuracy For E-911 Calls;
22. U.S. Pat. No. 6,317,604, Nov. 13, 2001, Centralized Database System For A Wireless Location System;
23. U.S. Pat. No. 6,288,676, Sep. 11, 2001, Apparatus And Method For Single Station Communications Localization;
24. U.S. Pat. No. 6,288,675, Sep. 11, 2001, Single Station Communications Localization System;
25. U.S. Pat. No. 6,281,834, Aug. 28, 2001, Calibration For Wireless Location System;
26. U.S. Pat. No. 6,266,013, Jul. 24, 2001, Architecture For A Signal Collection System Of A Wireless Location System;
27. U.S. Pat. No. 6,184,829, Feb. 6, 2001, Calibration For Wireless Location System;
28. U.S. Pat. No. 6,172,644, Jan. 9, 2001, Emergency Location Method For A Wireless Location System;
29. U.S. Pat. No. 6,115,599, Sep. 5, 2000, Directed Retry Method For Use In A Wireless Location System;
30. U.S. Pat. No. 6,097,336, Aug. 1, 2000, Method For Improving The Accuracy Of A Wireless Location System;
31. U.S. Pat. No. 6,091,362, Jul. 18, 2000, Bandwidth Synthesis For Wireless Location System;
32. U.S. Pat. No. 6,047,192, Apr. 4, 2000, Robust, Efficient, Localization System;
33. U.S. Pat. No. 6,108,555, Aug. 22, 2000, Enhanced Time Difference Localization System;
34. U.S. Pat. No. 6,101,178, Aug. 8, 2000, Pseudolite-Augmented GPS For Locating Wireless Telephones;

35. U.S. Pat. No. 6,119,013, Sep. 12, 2000, Enhanced Time-Difference Localization System;
36. U.S. Pat. No. 6,127,975, Oct. 3, 2000, Single Station Communications Localization System;
37. U.S. Pat. No. 5,959,580, Sep. 28, 1999, Communications Localization System;
38. U.S. Pat. No. 5,608,410, Mar. 4, 1997, System For Locating A Source Of Bursty Transmissions; and
39. U.S. Pat. No. 5,327,144, Jul. 5, 1994, Cellular Telephone Location System; and
40. U.S. Pat. No. 4,728,959, Mar. 1, 1988, Direction Finding Localization System.

CONCLUSION

The present invention's optimization of signal power and duration (or total energy, equivalent to the relevant product of duration multiplied by power) examines the potential for contributions from all nearest-neighbor LMUs surrounding the nominal MS position. The optimization progressively expands outward to greater distance extents in deriving the prioritized suite of selected cooperating LMU sites. In the illustrative embodiments of the present invention, the optimized power-control calculations are executed in the standard SMLC data processing facilities that augment the WCS services. The resultant assessed optimal power level and duration for the MS transmissions are provided to the BTS, and are preferentially commanded to the MS from the BTS, with the BTS exercising final power-control judgment in review of the current communications usage for the complete CGI. In the final evaluation using its own standard data processing facilities, the serving BTS may re-set or hand over the frequency, channel and/or CGI allocations of other active MS assignments, and potentially may also coordinate and schedule the power adjustment for the MS of interest with related power adjustments for other MSs that it is currently serving. This BTS, and/or associated BSC, coordination may include assessment of the current communications traffic bit rates (full vs. partial) and time-slot usage, frequency hopping patterns, power levels and ceilings (i.e., maximums achievable or acceptable), and local noise or interference levels within its operational domain. Thus the integrated cooperative exchange between the SMLC and the WCS of data characterizing the MS signal and the communications environment enables the dynamic adjustment of the MS power to enhance the performance of the augmenting location service, while mitigating or avoiding degradation in communications services.

As the basis for the optimal power-control evaluations of the present invention, the nominal or starting MS position may be obtained merely through use of the WCS deployment information associated with the current relevant SBTS. With such information available for the WCS deployment configuration, the CGI location and direction of orientation for the subject serving sector's antennas can enable use of a nominal MS ("sector centroid") location that is along the center LOB of the sector at a nominal distance from the BTS, e.g., one half of the distance to the next nearest neighbor CGI border approximately along the same central LOB. Alternatively, with any of the more precisely measured and/or commanded items of information described above, the power-control technology of the present invention may estimate a more refined representation of the nominal MS location. As described above, such refining information may include: 1) the TA assessed for the current MS RTD, thereby providing a direct measurement of the associated distance from the serving BTS; 2) the received power level(s) for the MS as observed at the serving BTS and at any other BTSs, if available, thereby inferring relative distance ratios through a propagation loss model; 3) the BTS commanded power level for the MS, so that the observed power levels at the BTS(s) can be directly related to individual MS-to-BTS distance(s) through a propagation loss model; 4) the (preferably multiple) downlink BTS power level(s) and/or EOTD(s) as measured by the MS and reported to the power optimization evaluation in network measurement reports (NMRs) and associated control communications; 5) the WCS's selected downlink BTS transmission power levels, thereby inferring distance(s) from the MS to the associated individual BTS(s) through propagation loss models; and 6) an estimated MS location or other LMU-extracted measurements of location-related signal characteristics, e.g., TOAs, TDOAs, AOAs, signal strengths, or correlation levels, as enabled or provided by the affiliated SMLC. All such information items are individually or in cooperation incorporated into the refined assessment of the nominal MS location, and additionally contribute to the refined assessment of the in situ current signal propagation environment in which the MS is operating.

In the power-control assessments of the present invention, the selection and evaluation of the optimal MS signal transmission power level and duration of adjusted power are directly enhanced through the exploitation of current or real-time measurements of uplink and/or downlink propagation path losses, to the extent available or obtainable. Such real-time propagation loss measurements are used in the evaluation, together with applicable propagation loss model(s), not only to directly infer the relevant associated propagation path length(s) but also to indirectly support a dynamically calibrated assessment of the propagation losses themselves. With the resultant dynamically adjusted characterization of the anticipated propagation losses, the power-control evaluations of the present invention more accurately assess the potential power level for the MS that would most likely achieve the immediately objective location or other augmentation service performance.

The principles, embodiments, and modes of operation of the present invention have been set forth in the foregoing specification, from which it should now be readily apparent that a person of ordinary skill in the art may implement appropriate data processing to effect the described technology. The embodiments disclosed herein should be interpreted as illustrating the present invention and not as restricting it. Numerous variations and changes can be made to the foregoing illustrative embodiments without departing from the scope of the present invention as set forth in the appended claims.

Accordingly, the true scope of the present invention is not limited to the presently preferred or illustrative embodiments disclosed herein. For example, the foregoing disclosure of an illustrative embodiment of a dynamic transmitted power-control system uses explanatory terms, such as Location Measurement Unit (LMU), Serving Mobile Location Center (SMLC), and the like, which should not be construed so as to limit the scope of protection of the following claims, or to otherwise imply that the inventive aspects of the system are limited to the particular methods and apparatus disclosed. Moreover, as will be understood by those skilled in the art, the inventive aspects disclosed herein may be applied in or for the benefit of wireless communication systems that are not based on specific wireless location-determination techniques. For example, the processes by which a wireless communications system determines the optimal time and serving cell identity for a communications handover (HO) can benefit from the dynamic power-control determinations. Similarly, the invention is not limited to systems employing LMUs and other subsystems constructed as described above. The LMUs, SMLC, etc., are, in essence, programmable data collection and processing devices that could take a variety of forms without departing from the inventive concepts disclosed herein. Given the declining cost of digital signal processing and other processing functions, it is possible, for example, to transfer the processing for a particular function from one of the functional elements described herein to another functional element without changing the inventive operation of the system. In many cases, the place of implementation (i.e., the functional element) described herein is merely a designer's preference and not a hard requirement.

Moreover, control channels in newer GSM-based systems, such as UMTS, are known as access channels whereas data or voice channels are known as traffic channels, where such access and traffic channels may share the same frequency band and modulation scheme but be separated by code. Within this specification, a general reference to control and access channels, or voice and data channels, shall refer to all types of control or voice and data channels, whatever the preferred terminology for a particular air interface. Moreover, given the many types of air interfaces (e.g., IS-95 CDMA, CDMA 2000, UMTS, and W-CDMA) used throughout the world, this specification does not exclude any air interface from the inventive concepts described herein. Those skilled in the art will recognize other interfaces used elsewhere are derivatives of or similar in class to those described above. Accordingly, except as they may be expressly so limited, the scope of protection of the following claims is not intended to be limited to the specific embodiments described above.

I claim:

1. A method for controlling an RF signal characteristic for a signal transmitted from a mobile station to support an augmenting service associated with a wireless communications system, the method comprising:

collecting data relating to values of said signal characteristic, wherein the collected data includes a plurality of the following measurement types: a measurement of the power level for a downlink signal from a base transceiver station received at the mobile station; a measurement of the time of arrival for a downlink signal from a base transceiver station received at the mobile station; a measurement of the time difference of arrival for a downlink signal from a base transceiver station received at the mobile station; a measurement of the round trip delay for the propagation of an RF signal over the two-way path that includes a downlink and an uplink direction between a base transceiver station and the mobile station; a measurement of the timing advance for the propagation of an RF signal over the two-way paths that include downlink and uplink directions between a base transceiver station and the mobile station; a wireless communications system parameter specifying a power level commanded for a downlink signal as transmitted from a base transceiver station; a wireless communications system parameter specifying a power level commanded for an uplink signal as transmitted from the mobile station; a representation of the RF signal propagation loss between a base transceiver station and an estimated location for the mobile station; a representation of the RF signal transmission and reception system gains for a signal path between a base transceiver station and an estimated location for the mobile station; a measurement of communications system interference at a base transceiver station; a measurement of communications system quality of service at a base transceiver station; a measurement of communications system bit error rate at a base transceiver station; data indicative of a number of location measurement units that are able to receive a transmission from the mobile station;

evaluating the collected data to derive a characteristic-dependent expected measure of effectiveness for an expected performance of said augmenting service, wherein said augmenting service comprises a wireless location determination service and said expected measure of effectiveness includes an expected location determination accuracy;

determining an optimal value for said characteristic to support said augmenting service, wherein the determination of an optimal value comprises jointly assessing both an expected location measurement accuracy and communications system quality of service or bit error rate expected from the impacts of interference associated with candidate adjusted signal characteristics;

communicating said optimal value to said mobile station; and using said optimal value to control the mobile station's transmitted signal.

2. A method as recited in claim 1, wherein the signal characteristic to be controlled is the power level of a signal transmitted by the mobile station.

3. A method as recited in claim 1, wherein the signal characteristic to be controlled is the time duration of a signal transmitted by the mobile station.

4. A method as recited in claim 1, wherein the signal characteristic to be controlled is the energy of the signal transmitted by the mobile station.

5. A method as recited in claim 1, further comprising using said optimal value in said mobile station to control said characteristic of the mobile station's transmitted signal.

6. A method as recited in claim 1, wherein said collected data includes a measurement of the power level for a downlink signal from a base transceiver station received at the mobile station.

7. A method as recited in claim 1, wherein said collected data includes a measurement of the time of arrival for a downlink signal from a base transceiver station received at the mobile station.

8. A method as recited in claim 1, wherein said collected data includes a measurement of the time difference of arrival for a downlink signal from a base transceiver station received at the mobile station.

9. A method as recited in claim 1, wherein said collected data includes a measurement of the round trip delay for the propagation of an RF signal over the two-way path that includes a downlink and an uplink direction between a base transceiver station and the mobile station.

10. A method as recited in claim 1, wherein said collected data includes a measurement of the timing advance for the propagation of an RF signal over the two-way paths that include downlink and uplink directions between a base transceiver station and the mobile station.

11. A method as recited in claim 1, wherein said collected data includes a measurement of the power level for an uplink signal from the mobile station received at a base transceiver station.

12. A method as recited in claim 1, wherein said collected data includes a measurement of the time of arrival for an uplink signal from the mobile station received at a base transceiver station.

13. A method as recited in claim 1, wherein said collected data includes a measurement of the time difference of arrival for an uplink signal from the mobile station received at a base transceiver station.

14. A method as recited in claim 1, wherein said collected data includes a measurement of the angle of arrival for an uplink signal from the mobile station received at a base transceiver station.

15. A method as recited in claim 1, wherein said collected data includes a wireless communications system parameter specifying a power level commanded for a downlink signal as transmitted from a base transceiver station.

16. A method as recited in claim 1, wherein said collected data includes a wireless communications system parameter specifying a power level commanded for an uplink signal as transmitted from the mobile station.

17. A method as recited in claim 1, wherein said collected data includes a representation of the RF signal propagation loss between a base transceiver station and an estimated location for the mobile station.

18. A method as recited in claim 1, wherein said collected data includes a representation of the RF signal transmission and reception system gains for a signal path between a base transceiver station and an estimated location for the mobile station.

19. A method as recited in claim 1, wherein said collected data includes an estimated location for the mobile station provided from a location determination process.

20. A method as recited in claim 1, wherein said collected data includes a measurement of communications system interference at a base transceiver station.

21. A method as recited in claim 1, wherein said collected data includes a measurement of communications system quality of service at a base transceiver station.

22. A method as recited in claim 1, wherein said collected data includes a measurement of communications system bit error rate at a base transceiver station.

23. A method as recited in claim 1, wherein said collected data includes data indicative of a number of location measurement units that are able to receive a transmission from the mobile station.

24. A method as recited in claim 23, further comprising the step of causing the mobile station to increase the power of its transmissions to enable a prescribed number of location measurement units to receive said transmission.

25. A method as recited in claim 1, wherein said expected measure of effectiveness includes a representation of an expected location determination accuracy.

26. A method as recited in claim 25, wherein said representation of expected location accuracy includes at least one parameter representing an expected uncertainty of a location error covariance matrix.

27. A method as recited in claim 26, wherein the parametric representation of the expected location uncertainty includes at least one member of a group consisting of an expected determinant of the location error covariance matrix, an expected trace of the location error covariance matrix, a combination of said determinant and trace, and an expected dilution of precision for the expected location determination.

28. A method as recited in claim 1, wherein the determination of an optimal value further comprises determining whether an adequate number of location measurement units received the transmission from the mobile station.

29. A method as recited in claim 1, wherein the determination of an optimal value further comprises determining whether an adequate geometry of location measurement units received the transmission from the mobile station.

30. A method as recited in claim 1, further comprising the steps of:
  exchanging data between a wireless communications system and an augmenting service system; and
  sharing between the processing facilities of said wireless communications system and said augmenting service system.

31. A control system, comprising:
(a) a processor programmed to receive collected data relating to a signal characteristic associated with a signal transmitted by a mobile station and to derive a characteristic-dependent expected measure of effectiveness for an expected performance of an augmenting service, and to determine an optimal value for said characteristic to support said augmenting service, wherein said augmenting service comprises a wireless location determination service, said expected measure of effectiveness includes an expected location determination accuracy, and the determination of an optimal value comprises jointly assessing both an expected location measurement accuracy and communications system quality of service or bit error rate; and wherein the collected data includes a plurality of the following measurement types: a measurement of the power level for a downlink signal from a base transceiver station received at the mobile station; a measurement of the time of arrival for a downlink signal from a base transceiver station received at the mobile station; a measurement of the time difference of arrival for a downlink signal from a base transceiver station received at the mobile station; a measurement of the round trip delay for the propagation of an RF signal over the two-way path that includes a downlink and an unlink direction between a base transceiver station and the mobile station; a measurement of the timing advance for the propagation of an RF signal over the two-way paths that include downlink and uplink directions between a base transceiver station and the mobile station; a wireless communications system parameter specifying a power level commanded for a downlink signal as transmitted from a base transceiver station a wireless communications system parameter specifying a power level commanded for an uplink signal as transmitted from the mobile station; a representation of the RF signal propagation loss between a base transceiver station and an estimated location for the mobile station; a representation of the RF signal transmission and reception system gains for a signal path between a base transceiver station and an estimated location for the mobile station; a measurement of communications system interference at a base transceiver station; a measurement of communications system quality of service at a base transceiver station; a measurement of communications system bit error rate at a base transceiver station; data indicative of a number of location measurement units that are able to receive a transmission from the mobile station; and
(b) a mechanism to communicate said optimal value to said mobile station.

32. A system as recited in claim 31, wherein the signal characteristic to be controlled is the power level of a signal transmitted by the mobile station.

33. A system as recited in claim 31, wherein the signal characteristic to be controlled is the time duration of a signal transmitted by the mobile station.

34. A system as recited in claim 31, wherein the signal characteristic to be controlled is the energy of the signal transmitted by the mobile station.

35. A system as recited in claim 31, further comprising a program in said mobile station for using said optimal value to control said characteristic of the mobile station's transmitted signal.

36. A system as recited in claim 31, wherein said collected data includes a measurement of the power level for a downlink signal from a base transceiver station received at the mobile station.

37. A system as recited in claim 31, wherein said collected data includes a measurement of the time of arrival for a downlink signal from a base transceiver station received at the mobile station.

38. A system as recited in claim 31, wherein said collected data includes a measurement of the time difference of arrival for a downlink signal from a base transceiver station received at the mobile station.

39. A system as recited in claim 31, wherein said collected data includes a measurement of the round trip delay for the propagation of an RF signal over the two-way paths that include a downlink and an uplink directions between a base transceiver station and the mobile station.

40. A system as recited in claim 31, wherein said collected data includes a measurement of the timing advance for the propagation of an RF signal over the two-way paths that include the downlink and an uplink directions between the base transceiver station and the mobile station.

41. A system as recited in claim 31, wherein said collected data includes a measurement of the power level for an uplink signal from the mobile station received at a base transceiver station.

42. A system as recited in claim 31, wherein said collected data includes a measurement of the time of arrival for an uplink signal from the mobile station received at a base transceiver station.

43. A system as recited in claim 31, wherein said collected data includes a measurement of the time difference of arrival for an uplink signal from the mobile station received at a base transceiver station.

44. A system as recited in claim 31, wherein said collected data includes a measurement of the angle of arrival for an uplink signal from the mobile station received at a base transceiver station.

45. A system as recited in claim 31, wherein said collected data includes a wireless communications system parameter specifying a power level commanded for a downlink signal as transmitted from a base transceiver station.

46. A system as recited in claim 31, wherein said collected data includes a wireless communications system parameter specifying a power level commanded for an uplink signal as transmitted from the mobile station.

47. A system as recited in claim 31, wherein said collected data includes a representation of the RF signal propagation loss between a base transceiver station and an estimated location for the mobile station.

48. A system as recited in claim 31, wherein said collected data includes a representation of the RF signal transmission and reception system gains for a signal path between a base transceiver station and an estimated location for the mobile station.

49. A system as recited in claim 31, wherein said collected data includes an estimated location for the mobile station provided from a location determination process.

50. A system as recited in claim 31, wherein said collected data includes a measurement of communications system interference at a base transceiver station.

51. A system as recited in claim 31, wherein said collected data includes a measurement of communications system quality of service at a base transceiver station.

52. A system as recited in claim 31, wherein said collected data includes a measurement of communications system bit error rate at a base transceiver station.

53. A system as recited in claim 31 wherein said measure of expected location determination accuracy includes at least one parameter representing an expected uncertainty of a location error covariance matrix.

54. A system as recited in claim 53, wherein the parametric representation of the expected location uncertainty includes at least one member of a group consisting of an expected determinant of the location error covariance matrix, an expected trace of the location error covariance matrix, a combination of said determinant and trace, and an expected dilution of precision for the expected location determination.

55. A system as recited in claim 31, further comprising a mechanism for exchanging data between a wireless communications system and an augmenting service system, wherein processing is shared between the processing facilities of said wireless communications system and said augmenting service system.

56. A system as recited in claim 31, wherein the processor is programmed to receive collected data including data indicative of a number of location measurement units that are able to receive a transmission from the mobile station.

57. A system as recited in claim 56, further comprising means for causing the mobile station to increase the power of its transmissions to enable a prescribed number of location measurement units to receive said transmission.

58. A system as recited in claim 31, wherein the processor is programmed for determining whether an adequate number of location measurement units received the transmission from the mobile station.

59. A system as recited in claim 31, wherein the processor is programmed for determining whether an adequate geometry of location measurement units received the transmission from the mobile station.

60. A wireless communications system including base transceiver stations for communicating with mobile stations; a wireless location system; and a transmission power control system for collecting data relating to a transmission power level associated with a signal transmitted by a mobile station (MS) of interest and processing the collected data to derive an expected measure of effectiveness for an expected performance of the location system, wherein said expected measure of effectiveness includes a representation of an expected location determination accuracy, and wherein said transmission power control system comprises a processor configured to determine an optimal value for the transmission power of said MS of interest to support said location system, and a mechanism to communicate said optimal value to said MS of interest; wherein the collected data includes a plurality of the following measurement types: a measurement of the power level for a downlink signal from a base transceiver station received at the mobile station; a measurement of the time of arrival for a downlink signal from a base transceiver station received at the mobile station; a measurement of the time difference of arrival for a downlink signal from a base transceiver station received at the mobile station; a measurement of the round trip delay for the propagation of an RF signal over the two-way path that includes a downlink and an uplink direction between a base transceiver station and the mobile station; a measurement of the timing advance for the propagation of an RF signal over the two-way paths that include downlink and uplink directions between a base transceiver station and the mobile station; a wireless communications system parameter specifying a power level commanded for a downlink signal as transmitted from a base transceiver station; a wireless communications system parameter specifying a power level commanded for an uplink signal as transmitted from the mobile station; a representation of the RF signal propagation loss between a base transceiver station and an estimated location for the mobile station; a representation of the RF signal transmission and reception system gains for a signal path between a base transceiver station and an estimated location for the mobile station; a measurement of communications system interference at a base transceiver station; a measurement of communications system quality of service at a base transceiver station; a measurement of communications system bit error rate at a base transceiver station; data indicative of a number of location measurement units that are able to receive a transmission from the mobile station.

61. A wireless communications system as recited in claim 60, further comprising means for controlling the energy of the signal transmitted by the MS of interest.

62. A wireless communications system as recited in claim 60, further comprising means for controlling the time duration of the signal transmitted by the MS of interest.

63. A wireless communications system as recited in claim 60, wherein said collected data includes a measurement of the power level for a downlink signal from a base transceiver station received at the mobile station.

64. A wireless communications system as recited in claim 60, wherein said collected data includes a measurement of the time of arrival for a downlink signal from a base transceiver station received at the mobile station.

65. A wireless communications system as recited in claim 60, wherein said collected data includes a measurement of the time difference of arrival for a downlink signal from a base transceiver station received at the mobile station.

66. A wireless communications system as recited in claim 60, wherein said collected data includes a measurement of the round trip delay for the propagation of an RF signal over the two-way paths that include a downlink and an uplink directions between a base transceiver station and the mobile station.

67. A wireless communications system as recited in claim 60, wherein said collected data includes a measurement of the timing advance for the propagation of an RF signal over the two-way paths that include the downlink and an uplink directions between the base transceiver station and the mobile station.

68. A wireless communications system as recited in claim 60, wherein said collected data includes a measurement of the power level for an uplink signal from the mobile station received at a base transceiver station.

69. A wireless communications system as recited in claim 60, wherein said collected data includes a measurement of the time of arrival for an uplink signal from the mobile station received at a base transceiver station.

70. A wireless communications system as recited in claim 60, wherein said collected data includes a measurement of the time difference of arrival for an uplink signal from the mobile station received at a base transceiver station.

71. A wireless communications system as recited in claim 60, wherein said collected data includes a measurement of the angle of arrival for an uplink signal from the mobile station received at a base transceiver station.

72. A wireless communications system as recited in claim 60, wherein said collected data includes a wireless communications system parameter specifying a power level commanded for a downlink signal as transmitted from a base transceiver station.

73. A wireless communications system as recited in claim 60, wherein said collected data includes a wireless communications system parameter specifying a power level commanded for an uplink signal as transmitted from the mobile station.

74. A wireless communications system as recited in claim 60, wherein said collected data includes a representation of the RF signal propagation loss between a base transceiver station and an estimated location for the mobile station.

75. A wireless communications system as recited in claim 60, wherein said collected data includes a representation of the RF signal transmission and reception system gains for a signal path between a base transceiver station and an estimated location for the mobile station.

76. A wireless communications system as recited in claim 60, wherein said collected data includes an estimated location for the mobile station provided from a location determination process.

77. A wireless communications system as recited in claim 60, wherein said collected data includes a measurement of communications system interference at a base transceiver station.

78. A wireless communications system as recited in claim 60, wherein said collected data includes a measurement of communications system quality of service at a base transceiver station.

79. A wireless communications system as recited in claim 60, wherein said collected data includes a measurement of communications system bit error rate at a base transceiver station.

80. A wireless communications system as recited in claim 60, wherein said representation of expected location determination accuracy includes at least one parameter representing an expected uncertainty of a location error covariance matrix.

81. A wireless communications system as recited in claim 80, wherein the parametric representation of the expected location uncertainty includes at least one member of a group consisting of an expected determinant of the location error covariance matrix, an expected trace of the location error covariance matrix, a combination of said determinant and trace, and an expected dilution of precision for the expected location determination.

82. A wireless communications system as recited in claim 60, wherein the determination of an optimal value further comprises jointly assessing both an expected location measurement accuracy and communications system quality of service or bit error rate expected from the impacts of interference associated with candidate adjusted signal characteristics.

83. A wireless communications system as recited in claim 60, further comprising a mechanism for exchanging data between the wireless communications system and the location system, wherein processing is shared between the processing facilities of said wireless communications system and said location system.

84. A wireless communications system as recited in claim 60, wherein the processor is programmed to receive collected data including data indicative of a number of location measurement units that are able to receive a transmission from the mobile station.

85. A wireless communications system as recited in claim 84, further comprising means for causing the mobile station to increase the power of its transmissions to enable a prescribed number of location measurement units to receive said transmission.

86. A wireless communications system as recited in claim 60, wherein the processor is programmed for determining whether an adequate number of location measurement units received the transmission from the mobile station.

87. A wireless communications system as recited in claim 60, wherein the processor is programmed for determining whether an adequate geometry of location measurement units received the transmission from the mobile station.

88. A process for the determining an optimized set of mobile station (MS) signal-transmission settings to enhance the performance of a serving mobile location center (SMLC) that augments a wireless communication system (WCS), wherein said SMLC comprises a plurality of location measurement units (LMUs), comprising:
    collecting available information from a plurality of sources, said plurality of sources including a mobile station (MS) to be located, the serving mobile location center (SMLC) and at least one of a base transceiver station (BTS) and base station controller (BSC), wherein the available information collected includes data characterizing current signal and noise characteristics present in a domain of the WCS;
    making a preliminary calculation of a nominal MS location based on the collected information;
    using the nominal MS location to derive initial estimates of distance-dependent signal propagation losses for the propagation of a signal from the nominal MS location to the locations of candidate cooperating BTS and/or LMU reception sites;
    evaluating anticipated performance by applying the estimated signal propagation losses to assess signal and noise conditions that would prevail at each candidate cooperating BTS and/or LMU site;
    assessing candidate MS signal power and duration characteristics for their potential contribution to location-determination accuracy, including, for each candidate cooperating site, comparing currently postulated MS transmission settings with those judged to be probabilistically required, and determining the probability that each candidate cooperating site could provide an acceptable measurement under the assessed signal and interference conditions local to the cooperating site;
    calculating an anticipated location uncertainty;
    deciding whether the anticipated location uncertainty is acceptable;
    upon deciding that the anticipated location uncertainty is acceptable, evaluating the interference impacts of potentially raised power or energy level for the MS; and
    determining optimal settings for the desired signal transmissions from the MS, and communicating these optimal setting in a command message so as to cause the MS to implement its signal transmissions with the power level(s) dictated in the command message.

89. A process as recited in claim 88, further comprising, upon deciding that the anticipated location accuracy is not acceptable, evaluating the nature of the performance deficiency.

90. A process as recited in claim 89, further comprising determining that a volume of uncertainty has nearly equal extent in all required dimensions and exceeds the acceptable performance limits, and attempting to reduce the uncertainty in all of said required dimensions.

91. A process as recited in claim 90, wherein the attempt to reduce uncertainty in all said required dimensions includes the addition of measurements from additional cooperating sites distributed in angular directions distributed around the MS location.

92. A process as recited in claim 89, further comprising determining that a volume of uncertainty is excessive only for a subset of required dimensions, and attempting to reduce the uncertainty for said subset of required dimensions.

93. A process as recited in claim 92, wherein the attempt to reduce the uncertainty for said subset of required dimensions includes obtaining improved measurements from BTS and/or LMU sites with baselines distributed along or closely parallel with an excessive axis direction.

94. A process as recited in claim 88, further comprising determining that the transmission power levels of the MS will degrade the anticipated communications quality of service (QoS), and performing mitigating procedures to alleviate such effects.

95. A process as recited in claim 94, wherein said mitigating procedures include raising the temporary signal strengths of other mobile stations currently served by the same BTS.

96. A process as recited in claim 94, wherein said mitigating procedures include handing over communications service for other mobile stations currently served by the same BTS to one or more neighboring BTS.

97. A process as recited in claim 94, wherein said mitigating procedures include adjusting time-slot usage or frequency-hopping patterns for other mobile stations currently served by the same BTS so as to mitigate potential interference impacts.

98. A process as recited in claim 88, wherein the step of making a preliminary calculation of a nominal MS location comprises determining a sector centroid position and identifying the nominal MS location as the sector centroid position.

99. A process as recited in claim 98, wherein said sector centroid position is one-half the distance from a serving BTS antenna to the position of the nearest-neighbor BTS border approximately along a sector boresight line of bearing.

100. A system, comprising:
    a serving mobile location center (SMLC) including a plurality of location measurement units (LMUs), wherein said SMLC is configured to augment a wireless communication system (WCS) operatively coupled to said SMLC, said WCS including a plurality of base transceiver stations (BTSs); and
    an evaluation processor operatively coupled to said SMLC and configured to determine an optimized set of mobile station (MS) signal-transmission settings to enhance the performance of said SMLC, said evaluation processor being configured for:
        collecting available information from a plurality of sources, said plurality of sources including a mobile station (MS) to be located, the SMLC and at least one of a BTS and BSC, wherein the available information collected includes data characterizing current signal and noise characteristics present in a domain of the WCS;
        making a preliminary calculation of a nominal MS location based on the collected information;
        using the nominal MS location to derive initial estimates of distance-dependent signal propagation losses for the propagation of a signal from the nominal MS location to the locations of candidate cooperating BTS and/or LMU reception sites;
        evaluating anticipated performance by applying the estimated signal propagation losses to assess signal and noise conditions that would prevail at each candidate cooperating BTS and/or LMU site;

assessing candidate MS signal power and duration characteristics for their potential contribution to location-determination accuracy, including, for each candidate cooperating site, comparing currently postulated MS transmission settings with those judged to be probabilistically required, and determining the probability that each candidate cooperating site could provide an acceptable measurement under the assessed signal and interference conditions local to the cooperating site;

calculating an anticipated location uncertainty;

deciding whether the anticipated location uncertainty is acceptable;

evaluating the interference impacts of potentially raised power or energy level for the MS; and determining optimal settings for the desired signal transmissions from the MS, and communicating these optimal setting.

101. A system as recited in claim 100, said evaluation processor being further configured for, upon deciding that the anticipated location accuracy is not acceptable, evaluating the nature of the performance deficiency.

102. A system as recited in claim 101, said evaluation processor being further configured for determining that a volume of uncertainty has nearly equal extent in all required dimensions and exceeds the acceptable performance limits, and attempting to reduce the uncertainty in all of said required dimensions.

103. A system as recited in claim 102, wherein the attempt to reduce uncertainty in all said required dimensions includes the addition of measurements from additional cooperating sites distributed in angular directions distributed around the MS location.

104. A system as recited in claim 101, said evaluation processor being further configured for determining that a volume of uncertainty is excessive only for a subset of required dimensions, and attempting to reduce the uncertainty for said subset of required dimensions.

105. A system as recited in claim 104, wherein the attempt to reduce the uncertainty for said subset of required dimensions includes obtaining improved measurements from BTS and/or LMU sites with baselines distributed along or closely parallel with an excessive axis direction.

106. A system as recited in claim 100, said evaluation processor being further configured for determining that the transmission power levels of the MS will degrade the anticipated communications quality of service (QoS), and performing mitigating procedures to alleviate such effects.

107. A system as recited in claim 106, wherein said mitigating procedures include raising the temporary signal strengths of other mobile stations currently served by the same BTS.

108. A system as recited in claim 106, wherein said mitigating procedures include handing over communications service for other mobile stations currently served by the same BTS to one or more neighboring BTS.

109. A system as recited in claim 106, wherein said mitigating procedures include adjusting time-slot usage or frequency-hopping patterns for other mobile stations currently served by the same BTS so as to mitigate potential interference impacts.

110. A system as recited in claim 100, wherein making a preliminary calculation of a nominal MS location comprises determining a sector centroid position and identifying the nominal MS location as the sector centroid position.

111. A system as recited in claim 110, wherein said sector centroid position is one-half the distance from a serving BTS antenna to the position of the nearest-neighbor BTS border approximately along a sector boresight line of bearing.

* * * * *